United States Patent
Shiraishi

(10) Patent No.: US 10,404,379 B2
(45) Date of Patent: Sep. 3, 2019

(54) OPTICAL COMMUNICATION APPARATUS AND OPTICAL COMMUNICATION SYSTEM

(71) Applicant: FUJITSU LIMITED, Kawasaki-shi, Kanagawa (JP)

(72) Inventor: Takashi Shiraishi, Atsugi (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/876,701

(22) Filed: Jan. 22, 2018

(65) Prior Publication Data

US 2018/0219631 A1 Aug. 2, 2018

(30) Foreign Application Priority Data

Feb. 1, 2017 (JP) .................................. 2017-017137

(51) Int. Cl.
*H04B 10/50* (2013.01)
*H01S 3/094* (2006.01)
*H01S 3/067* (2006.01)
*H04B 10/564* (2013.01)

(52) U.S. Cl.
CPC ... *H04B 10/50577* (2013.01); *H01S 3/06779* (2013.01); *H01S 3/094042* (2013.01); *H04B 10/504* (2013.01); *H04B 10/50572* (2013.01); *H04B 10/564* (2013.01)

(58) Field of Classification Search
None
See application file for complete search history.

(56) References Cited

U.S. PATENT DOCUMENTS

| 5,535,038 | A | * | 7/1996 | Hinch | H04B 10/69 372/38.07 |
|---|---|---|---|---|---|
| 5,974,063 | A | | 10/1999 | Yoshida | |
| 7,113,708 | B1 | * | 9/2006 | Creaney | H04B 10/07955 398/140 |
| 2002/0105982 | A1 | | 8/2002 | Chin et al. | |
| 2003/0058507 | A1 | * | 3/2003 | Oomori | H04B 10/504 398/177 |
| 2006/0159461 | A1 | * | 7/2006 | Nelson | H04B 10/40 398/135 |

(Continued)

FOREIGN PATENT DOCUMENTS

| JP | 10-144986 | 5/1998 |
|---|---|---|
| JP | 2002-204022 | 7/2002 |

(Continued)

*Primary Examiner* — Kenneth N Vanderpuye
*Assistant Examiner* — David W Lambert
(74) *Attorney, Agent, or Firm* — Fujitsu Patent Center

(57) ABSTRACT

An optical communication apparatus includes: a light-receiving device that receives an optical signal transmitted from another optical communication apparatus through an optical fiber and converts the optical signal into an electrical signal; a first measurement circuit that measures an average power and a modulation power of the optical signal based on the electrical signal; a light-emitting device that transmits the optical signal to the another optical communication apparatus by emitting light in accordance with a driving current; a driver that causes the light-emitting device to transmit the optical signal according to a transmission signal by controlling the driving current based on the transmission signal; and a processor that adjusts the driving current based on the average power and the modulation power.

14 Claims, 21 Drawing Sheets

(56) References Cited

U.S. PATENT DOCUMENTS

2014/0056595 A1 2/2014 Matsui et al.
2016/0134365 A1* 5/2016 Cheng .............. H04B 10/07955
                    398/38

FOREIGN PATENT DOCUMENTS

JP  2003-298181  10/2003
JP  2014-045370  3/2014

* cited by examiner

FIG. 16

| IDENTIFICATION INFORMATION | DATE OF FIRST USE | INITIAL VALUE | ESTIMATED DATE OF FAILURE |
|---|---|---|---|
| E001 | 2015/5/1 | 3mA | 2016/12/10 |
| E002 | 2015/5/1 | 3mA | 2017/1/20 |
| E003 | 2015/5/1 | 3mA | 2016/10/30 |
| ⋮ | ⋮ | ⋮ | ⋮ |

| IDENTIFICATION INFORMATION | DATE OF FIRST USE | INITIAL VALUE | ESTIMATED DATE OF FAILURE | POWER DIFFERENCE |
|---|---|---|---|---|
| E001 | 2015/5/1 | 3mA | 2016/12/10 | 10dB |
| E002 | 2015/5/1 | 3mA | 2017/1/20 | 5dB |
| E003 | 2015/5/1 | 3mA | 2016/10/30 | 20dB |
| ⋮ | ⋮ | ⋮ | ⋮ | ⋮ |

OPTICAL COMMUNICATION APPARATUS AND OPTICAL COMMUNICATION SYSTEM

CROSS-REFERENCE TO RELATED APPLICATION

This application is based upon and claims the benefit of priority of the prior Japanese Patent Application No. 2017-17137, filed on Feb. 1, 2017, the entire contents of which are incorporated herein by reference.

FIELD

The embodiments discussed herein are related to an optical communication apparatus and an optical communication system.

BACKGROUND

In a data center or the like, a large number of servers are connected to one another through a plurality of switching apparatuses.

Japanese Laid-open Patent Publication No. 10-144986, Japanese Laid-open Patent Publication No. 2014-45370, and Japanese Laid-open Patent Publication No. 2003-298181 disclose examples of the related art.

SUMMARY

According to an aspect of the embodiments, an optical communication apparatus includes: a light-receiving device that receives an optical signal transmitted from another optical communication apparatus through an optical fiber and converts the optical signal into an electrical signal; a first measurement circuit that measures an average power and a modulation power of the optical signal based on the electrical signal; a light-emitting device that transmits the optical signal to the another optical communication apparatus by emitting light in accordance with a driving current; a driver that causes the light-emitting device to transmit the optical signal according to a transmission signal by controlling the driving current based on the transmission signal; and a processor that adjusts the driving current based on the average power and the modulation power.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 16 illustrates an example of a life table;

FIG. 21 illustrates an example of the life table.

DESCRIPTION OF EMBODIMENTS

Servers and switching apparatuses are connected by, for example, optical fibers. The optical fibers are connected to optical transceivers provided in the servers and the switching apparatuses, and corresponding optical transceivers communicate optical signals through the optical fibers. As data centers have become larger, the number of servers and switching apparatuses has increased, and the number of optical transceivers has also increased.

Output signals of a light-emitting device such as a vertical-cavity surface-emitting laser (VCSEL) included in an optical transceiver change depending on temperature and over time, and reception quality at an optical transceiver that receives output signals deteriorates. In order to avoid this, for example, optical signals output from the light-emitting device are monitored in the optical transceiver that transmits the optical signals, and a driving current supplied to the light-emitting device is adjusted such that the average power and an extinction ratio of optical signals do not vary.

When a failure rate of each optical transceiver is not so high but the number of optical transceivers is large, for example, time intervals at which an optical transceiver fails become shorter in a system. When a failure rate of an 8-channel optical transceiver is 10 fit/ch and the number of optical transceivers provided in a system is 100,000, for example, one optical transceiver fails in an average of five days. Because a failure of an optical transceiver is often caused by a failure of a light-emitting device, the reliability of light-emitting devices has to improve.

In order to monitor the average power and the extinction ratio of optical signals of a light-emitting device, for example, a light-receiving device for monitoring the optical signals of the light-emitting device is provided in an optical transceiver separately from a light-receiving device that receives optical signals of a corresponding optical transceiver. Because a frequency band of optical signals has become wider as communication speed has increased, a light-receiving device having high time resolution is used to monitor the extinction ratio of optical signals. Because such a light-receiving device is small and accordingly a light-receiving surface thereof is also small, optical components such as a lens for guiding optical signals to the light-receiving surface are large. It might therefore be difficult to reduce optical transceivers in size. Since light-receiving devices whose time resolution and communication speed are high are expensive, optical transceivers might become costly.

An optical communication apparatus that extends a life of light-emitting devices therein with a simple configuration, for example, may be provided.

The following embodiments may be combined with one another insofar as no contradiction is caused in processing.

Figure 1:
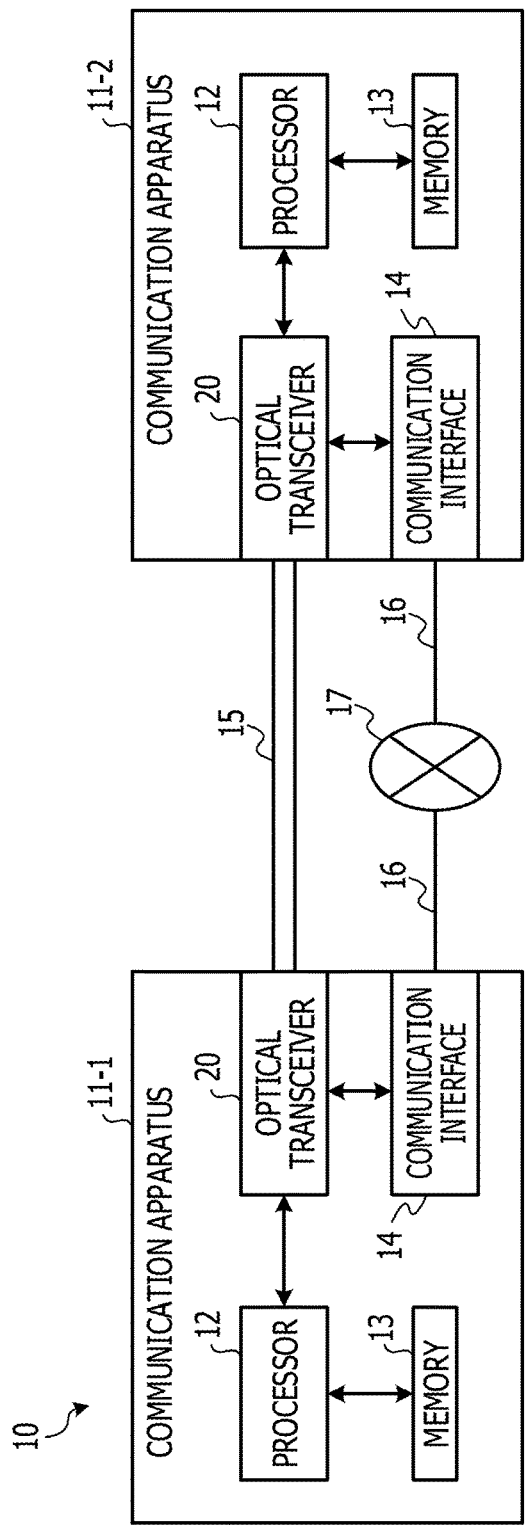
FIG. 1 illustrates an example of an optical communication system.

FIG. 1 illustrates an example of an optical communication system. An optical communication system 10 illustrated in FIG. 1 includes a plurality of communication apparatuses 11-1 and 11-2. The plurality of communication apparatuses 11-1 and 11-2 are, for example, a server and a switching apparatus. In the following description, the communication apparatuses 11-1 and 11-2 will be generically referred to as "communication apparatuses 11" when the communication apparatuses 11-1 and 11-2 are not particularly distinguished from each other. Although the optical communication system 10 illustrated in FIG. 1 includes two communication apparatuses 11, the optical communication system 10 may include three or more communication apparatuses 11, instead.

The communication apparatuses 11 each include a processor 12, a memory 13, a communication interface 14, and an optical transceiver 20. The optical transceiver 20 is connected to the optical transceiver 20 of the other communication apparatus 11 through an optical fiber 15. The optical transceiver 20 converts data output from the processor 12 from electrical signals into optical signals and transmits the optical signals to the other communication apparatus 11 through the optical fiber 15. The optical transceiver 20 converts the optical signals transmitted from the other communication apparatus 11 through the optical fiber 15 into electrical signals, generates data from the electrical signals, and outputs the data to the processor 12.

The optical transceiver 20 measures the average power and the like of optical signals transmitted from the other communication apparatus 11 through the optical fiber 15 and generates a control instruction based on measured values. The optical transceiver 20 then transmits, through the communication interface 14, the generated control instruction to the communication apparatus 11 that has transmitted the optical signals. Upon receiving, through the communication interface 14, the control instruction from the communication apparatus 11 that has received the optical signals, the optical transceiver 20 adjusts a driving current supplied to a light-emitting device that generates optical signals based on the received control instruction. The optical transceiver 20 is an example of an optical communication apparatus.

The communication interface 14 is connected to a communication network 17 through a communication cable 16 such as a metal cable. The communication interface 14 transmits, through communication cables 16 and the communication network 17, a control instruction output from the optical transceiver 20 to the communication apparatus 11 that has transmitted optical signals. If the communication interface 14 receives, through the communication cables 16 and the communication network 17, a control instruction from the communication apparatus 11 that has received optical signals, the communication interface 14 outputs the received control instruction to the optical transceiver 20. In the present embodiment, communication speed during communication through the communication cables 16 is lower than communication speed during communication through the optical fiber 15. For example, the communication speed during the communication through the optical fiber 15 is several Gbps or higher, and the communication speed during the communication through the communication cables 16 is about several Mbps. A management apparatus that manages states of the optical transceivers 20 of the communication apparatuses 11 is connected to the communication network 17.

The processor 12 includes, for example, a central processing unit (CPU), a field-programmable gate array (FPGA), a digital signal processor (DSP), or the like. The processor 12 performs a certain type of processing and transmits data generated as a result of the processing to the other communication apparatus 11 through the optical transceiver 20 and the optical fiber 15. The processor 12 performs a certain type of processing using data received from the other communication apparatus 11 through the optical transceiver 20 and the optical fiber 15. The processor 12 may communicate with the other communication apparatus 11 or the management apparatus through the communication interface 14.

The memory 13 includes, for example, a random-access memory (RAM) or a read-only memory (ROM) and stores programs or the like to be used by the processor 12 to perform processing. The processor 12 executes a program read from the memory 13 to perform a certain type of processing.

The optical transceiver 20 of each communication apparatus 11 communicates optical signals with the optical transceiver 20 of the other communication apparatus 11. In the following description, the optical transceiver 20 of the communication apparatus 11-1 illustrated in FIG. 1 will also be referred to as an "optical transceiver 20 that has transmitted optical signals" and the optical transceiver 20 of the communication apparatus 11-2 will also be referred to as an "optical transceiver 20 that has received optical signals" for convenience of description. The optical transceiver 20 that transmits optical signals is an example of an optical transmission device, and the optical transceiver 20 that receives optical signals is an example of an optical reception device.

Figure 2:
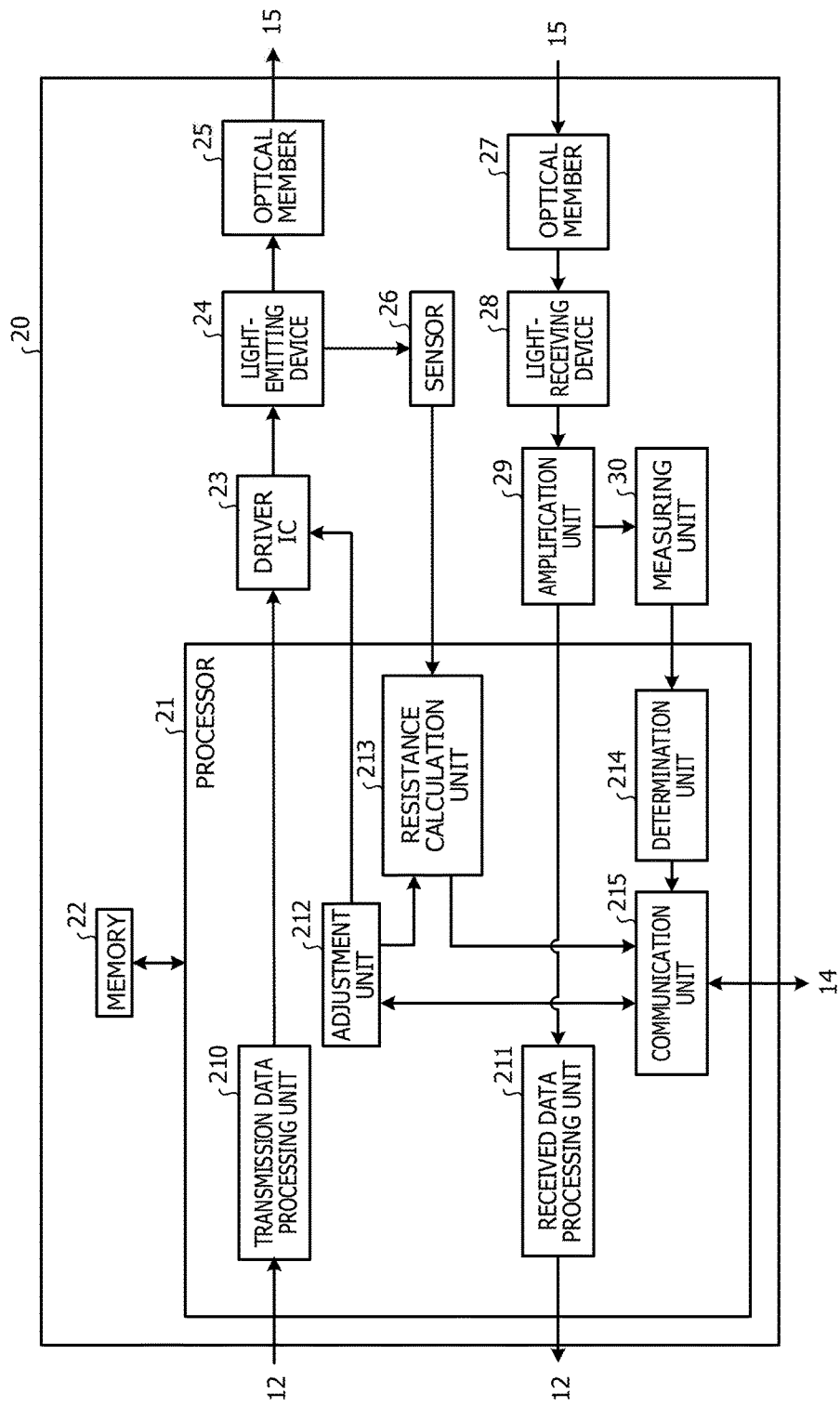
FIG. 2 illustrates an example of an optical transceiver.

FIG. 2 illustrates an example of the optical transceiver 20. The optical transceiver 20 illustrated in FIG. 2 includes, as illustrated in FIG. 2, for example, a processor 21, a memory 22, a driver integrated circuit (IC) 23, a light-emitting device 24, an optical component 25, a sensor 26, an optical component 27, a light-receiving device 28, an amplification unit 29, and a measuring unit 30.

The driver IC 23 controls a driving current supplied to the light-emitting device 24 based on transmission signals output from the processor 21. As a result, the driving current modulated with the transmission signals are supplied to the light-emitting device 24. If the processor 21 instructs the driver IC 23 to increase an average current, which is an average driving current, the driver IC 23 adjusts the driving current such that the average driving current supplied to the light-emitting device 24 increases by a certain value. If the processor 21 instructs the driver IC 23 to increase a modulation current, the driver IC 23 increases the modulation current supplied to the light-emitting device 24, that is, for example, the amplitude of the driving current supplied to the light-emitting device 24, by a certain value.

The light-emitting device 24 emits light in accordance with the driving current supplied from the driver IC 23. As a result, the light-emitting device 24 generates optical signals according to transmission signals. The light-emitting device 24 outputs the generated optical signals to the optical component 25. For example, the optical signals generated by the light-emitting device 24 have a frequency band of tens of GHz or higher. The light-emitting device 24 is, for example, a semiconductor laser such as a VCSEL.

The optical component 25 includes a lens, a mirror, and the like. The optical component 25 guides optical signals output from the light-emitting device 24 to the optical fiber 15. As a result, optical signals generated by the light-emitting device 24 are transmitted to the other communication apparatus 11 through the optical fiber 15.

The sensor 26 measures the current and voltage of the light-emitting device 24 and outputs a signal indicating results of the measurement to the processor 21.

The optical component 27 includes a lens, a mirror, and the like. The optical component 27 guides optical signals output from the optical fiber 15 to a light-receiving surface of the light-receiving device 28. As a result, the optical signals transmitted from the other communication apparatus 11 are received by the light-receiving device 28 through the optical fiber 15.

The light-receiving device 28 converts optical signals incident from the optical component 27 into electrical signals. The light-receiving device 28 outputs the received signals converted into the electrical signals to the amplification unit 29. For example, the light-receiving device 28 has a response speed of tens of GHz or higher.

The amplification unit 29 amplifies the power of received signals output from the light-receiving device 28 and outputs the received signals whose power has been amplified to the processor 21 and the measuring unit 30.

The measuring unit 30 measures an average power $P_{ave}$ and a modulation power $P_{oma}$ of optical signals received by the light-receiving device 28 based on received signals whose power has been amplified by the amplification unit 29. The measuring unit 30 outputs a signal indicating results of the measurement to the processor 21. The measuring unit 30 is an example of a first measuring unit.

Figure 3:
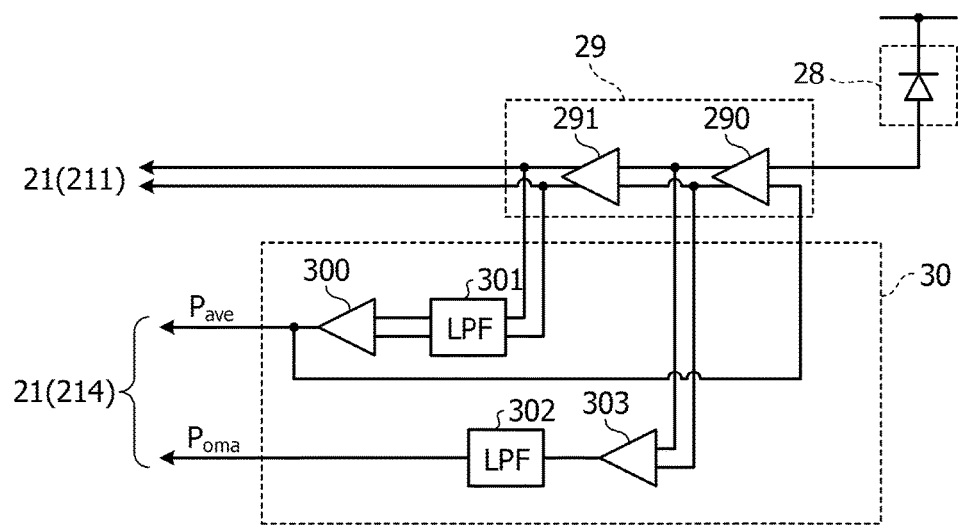
FIG. 3 illustrates an example of the circuit configuration of an amplification unit and a measuring unit.

FIG. 3 illustrates an example of the circuit configuration of the amplification unit 29 and the measuring unit 30. The amplification unit 29 includes a transimpedance amplifier (TIA) 290 and an amplifier 291. The TIA 290 converts current flowing through the light-receiving device 28 into voltage in accordance with the intensity of optical signals received by the light-receiving device 28. The amplifier 291 amplifies the power of the received signals converted into the voltage by the TIA 290. The received signals amplified by the amplifier 291 are output to a received data processing unit 211, which will be described later, of the processor 21.

The measuring unit 30 includes an amplifier 300, low-pass filters (LPFs) 301 and 302, and an integral network 303. The LPF 301 suppresses high-frequency components of received signals output from the amplifier 291. The amplifier 300 amplifies the signals whose high-frequency components have been suppressed by the LPF 301. Outputs of the integral network 303 are fed back to an input terminal of the TIA 290. The amplifier 300 outputs the signals to a determination unit 214, which will be described later, of the processor 21 as the average power $P_{ave}$.

The integral network 303 integrates received signals converted by the TIA 290 into voltage. The LPF 302 integrates high-frequency components of the signals integrated by the integral network 303. The signals whose high-frequency components have been suppressed by the LPF 302 are output to the determination unit 214, which will be described later, of the processor 21 as the modulation power $P_{oma}$.

The processor 21 illustrated in FIG. 2 includes, for example, a CPU, an FPGA, a DSP, or the like. The memory 22 includes a RAM, a ROM, or the like, for example, and stores programs and the like used by the processor 21 to perform processing. The processor 21 executes the programs read from the memory 22, for example, to achieve functions of a transmission data processing unit 210, the received data processing unit 211, an adjustment unit 212, a resistance calculation unit 213, the determination unit 214, and a communication unit 215.

The transmission data processing unit 210 generates transmission signals by adding data such as a header to data output from the processor 12. The transmission signals generated by the transmission data processing unit 210 are converted from digital signals into analog signals and output to the driver IC 23. The transmission data processing unit 210 of the optical transceiver 20 may perform only a process for bypassing data without performing complex processing. In this case, a process for adding a header and other processes are performed not in the optical transceiver 20 but by a processor IC provided for the apparatus such as a server.

Received signals output from the amplification unit 29 are converted from analog signals into digital signals and input to the received data processing unit 211. The received data processing unit 211 generates received data based on the received signals converted into the digital signal. The received data processing unit 211 outputs the received data to the processor 12. The received data processing unit 211 of the optical transceiver 20 may perform only a process for bypassing data without performing complex processing, instead. In this case, the process for adding a header and other processes are performed not in the optical transceiver 20 but by a processor IC provided for the apparatus such as a server.

Results of measurement output from the measuring unit 30 are converted from analog signals into digital signals and input to the determination unit 214. The determination unit 214 determines whether the average power $P_{ave}$ of optical signals received by the light-receiving device 28 is smaller than a certain threshold $P_{th2}$ based on the results of measurement output from the measuring unit 30. The optical signals received by the light-receiving device 28 are optical signals transmitted from the other communication apparatus 11 through the optical fiber 15. The threshold $P_{th2}$ is an example of a second threshold. Data regarding the threshold $P_{th2}$ is saved to the memory 22, for example, in advance.

If the average power $P_{ave}$ is smaller than the threshold $P_{th2}$, the determination unit 214 calculates an extinction ratio ER of the optical signals received by the light-receiving device 28 based on the average power $P_{ave}$ and the modulation power $P_{oma}$ included in the results of the measurement output from the measuring unit 30. The determination unit 214 calculates the extinction ratio ER based on, for example, the following expression (1).

$$ER = 10 \times \log\left(\frac{2 + 10^{\frac{P_{oma}-P_{ave}}{10}}}{2 - 10^{\frac{P_{oma}-P_{ave}}{10}}}\right) \quad (1)$$

The determination unit 214 determines whether the extinction ratio ER is equal to or higher than a certain threshold $P_{th1}$. The threshold $P_{th1}$ is an example of a first threshold. Data regarding the threshold $P_{th1}$ is saved to the memory 22, for example, in advance. If the extinction ratio ER is equal to or higher than the threshold $P_{th1}$, the determination unit 214 outputs, to the communication unit 215, a control instruction to increase average current.

If the extinction ratio ER is lower than the threshold $P_{th1}$, the determination unit 214 determines whether the modulation power $P_{oma}$ is smaller than a certain threshold $P_{th3}$. The threshold $P_{th3}$ is an example of a third threshold. Data regarding the threshold $P_{th3}$ is saved to the memory 22, for example, in advance. If the modulation power $P_{oma}$ is smaller than the threshold $P_{th3}$, the determination unit 214 outputs, to the communication unit 215, a control instruction to increase modulation current.

If receiving, through the communication unit 215, a control instruction to increase average current from the other communication apparatus 11 that has received optical signals, the adjustment unit 212 instructs the driver IC 23 to increase the average current. If receiving, through the communication unit 215, a control instruction to increase modulation current from the other communication apparatus 11 that has received optical signals, the adjustment unit 212 instructs the driver IC 23 to increase the modulation current.

The adjustment unit 212 determines whether the average current of the light-emitting device 24 has reached a maximum value based on information regarding an initial value of the average current, information regarding an increase in the average current corresponding to one instruction to increase the average current, and information regarding the maximum value of the average current, and the number of instructions issued. The information regarding the initial value of the average current, an increase in the average current corresponding to one instruction to increase the average current, and the maximum value of the average current is saved to the memory 22, for example, in advance.

When the average current of the light-emitting device 24 has reached the maximum value, the adjustment unit 212 outputs, to the communication unit 215, a notification indicating the optical transceiver 20 in which the average current of the light-emitting device 24 has reached the maximum value. The communication unit 215 outputs the notification to the communication interface 14, and the communication interface 14 transmits the notification to the management apparatus that manages the states of the optical transceivers 20 of the communication apparatuses 11. As a result, a manager who manages the states of the optical transceivers 20 of the communication apparatuses 11 can identify, through the management apparatus, the optical transceiver 20 in which the average current of the light-emitting device 24 has reached the maximum value as a result of deterioration of the light-emitting device 24. Alternatively, the processor 21 and the memory 22 of the optical transceiver 20 can play the role of the management apparatus. In this case, the manager can obtain information regarding the optical transceiver 20 by accessing the optical transceiver 20.

After the average current of the light-emitting device 24 reaches the maximum value, the adjustment unit 212 does not instruct the driver IC 23 to increase the average current and the modulation current even if the adjustment unit 212 receives a control instruction from the communication apparatus 11 that has received optical signals. As a result, the light-emitting device 24 continues to transmit optical signals with the maximum average current and the modulation current that has increased as a result of past instructions until the light-emitting device 24 fails or is replaced. In addition, when the average current of the light-emitting device 24 has reached the maximum value, the adjustment unit 212 instructs the resistance calculation unit 213 to monitor the resistance of the light-emitting device 24.

If instructed by the adjustment unit 212 to monitor the resistance of the light-emitting device 24, the resistance calculation unit 213 calculates the resistance of the light-emitting device 24 at certain timings based on results of measurement performed by the sensor 26. The resistance calculation unit 213 calculates the resistance of the light-emitting device 24 at time intervals of, say, several minutes or several hours. The resistance calculation unit 213 outputs, to the communication unit 215, a notification including information regarding the calculated resistance of the light-emitting device 24. The communication unit 215 outputs the notification to the communication interface 14, and the communication interface 14 transmits the notification to the management apparatus that manages the states of the optical transceivers 20 of the communication apparatuses 11. The resistance of a semiconductor laser such as a VCSEL can sharply increase immediately before the semiconductor laser fails. The manager who manages the states of the optical transceivers 20 of the communication apparatuses 11, therefore, can detect a sign of a failure of the optical transceiver 20 by monitoring the resistance of the light-emitting device 24 through the management apparatus.

If receiving a control instruction from the determination unit 214, the communication unit 215 adds a header or the like to the control instruction to obtain a control signal in a certain format and outputs the obtained control signal to the communication interface 14. The communication interface 14 transmits, through the communication cables 16 and the communication network 17, the control signal including the control instruction to the communication apparatus 11 that has transmitted optical signals. In addition, if receiving, through the communication interface 14, a control signal from the other communication apparatus 11 that has received optical signals, the communication unit 215 extracts a control instruction included in the received control signal and outputs the extracted control instruction to the adjustment unit 212. In addition, if receiving a notification from the adjustment unit 212 or the resistance calculation unit 213, the communication unit 215 adds a header or the like to the notification to obtain a notification signal in a certain format and outputs the obtained notification signal to the communication interface 14. The communication interface 14 transmits the notification signal to the management apparatus through the communication cables 16 and the communication network 17.

Figure 4:
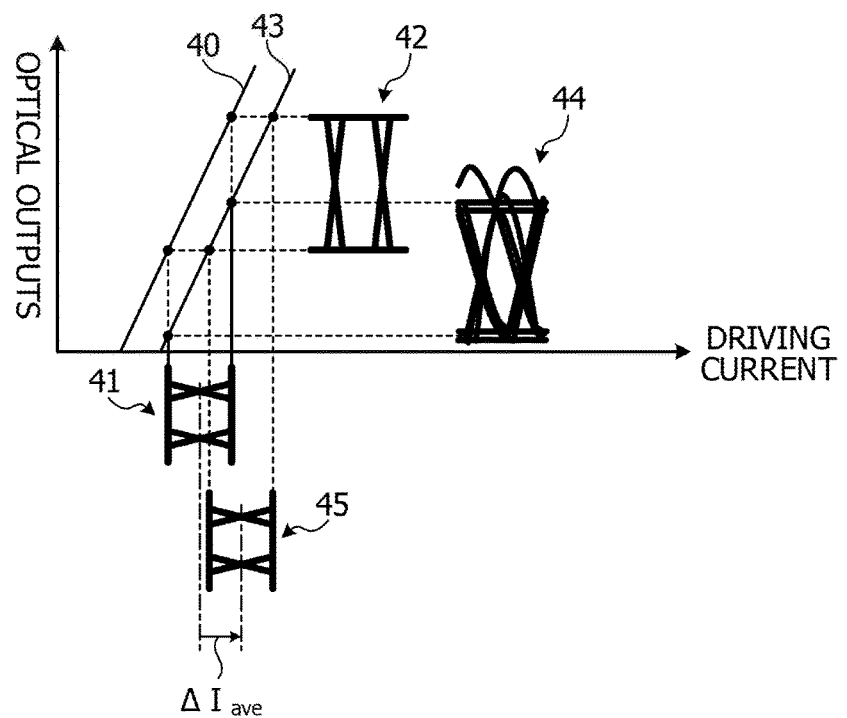
FIG. 4 illustrates an example of a change in optical signals.
Figure 5:
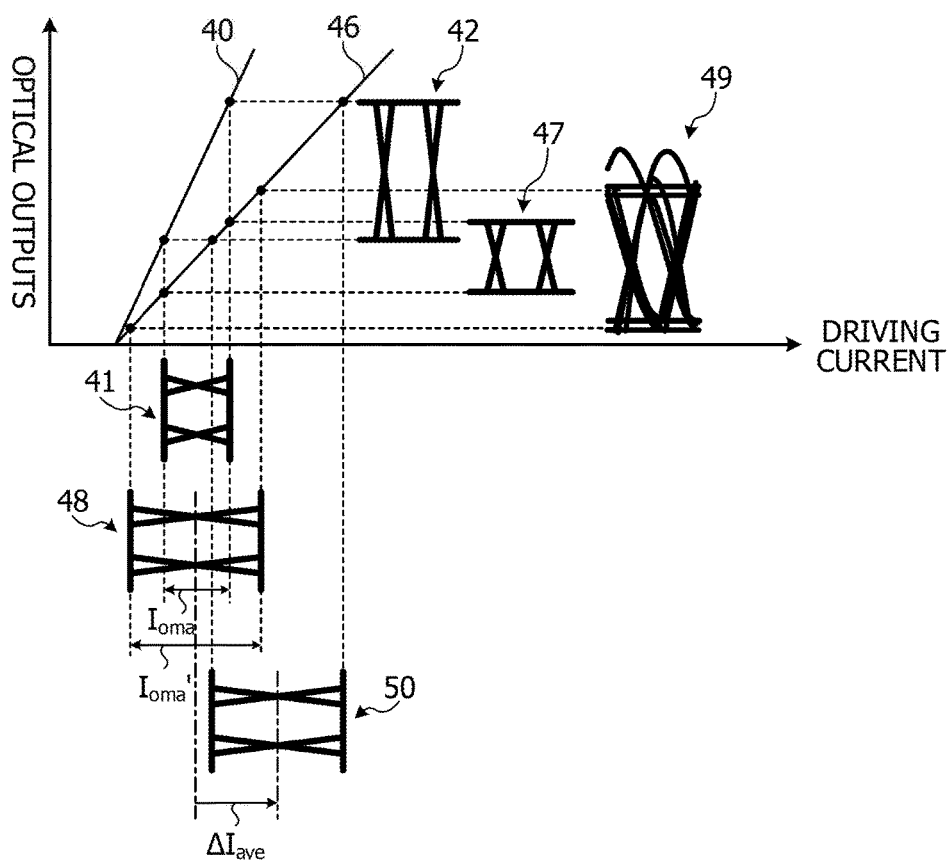
FIG. 5 illustrates an example of the change in optical signals.

Optical signals change as the light-emitting device 24 deteriorates. FIGS. 4 and 5 illustrate examples of a change in optical signals. The light-emitting device 24, such as a VCSEL, deteriorates in two deterioration modes, namely threshold deterioration and efficiency deterioration. FIG. 4 illustrates an example of a change in optical signals due to threshold deterioration of the light-emitting device 24. FIG. 5 illustrates an example of a change in optical signals due to efficiency deterioration of the light-emitting device 24.

If a relationship between a driving current and optical outputs before the light-emitting device 24 deteriorates is as indicated by a line 40 in FIG. 4, for example, optical signals indicated by a waveform 42 are output from the light-emitting device 24 after a driving current indicated by a waveform 41 is supplied to the light-emitting device 24. If the relationship between a driving current and optical outputs changes from the line 40 to a line 43 as a result of the threshold deterioration of the light-emitting device 24, optical signals indicated by a waveform 44 are output after the driving current indicated by the waveform 41 is supplied. In the case of the threshold deterioration of the light-emitting device 24, for example, the optical outputs decrease at both high and low levels of optical signals as illustrated in FIG. 4. As a result, the average power of optical signals decreases, and the extinction ratio ER increases.

If the optical outputs become too small at the low level, the quality of optical signals deteriorates as indicated by the waveform 44 in FIG. 4, for example, due to relaxation oscillations of the light-emitting device 24. As a result, reception quality deteriorates at the communication apparatus 11 that has received optical signals. If the relationship between a driving current and optical outputs changes from the line 40 to the line 43 due to the threshold deterioration of the light-emitting device 24 as illustrated in FIG. 4, for example, an average driving current supplied to the light-emitting device 24 is increased by a certain value (e.g., $\Delta I_{ave}$ illustrated in FIG. 4). As a result, a driving current indicated by a waveform 45 is supplied to the light-emitting device 24. Even if threshold deterioration occurs, the optical signals indicated by the waveform 42 are output from the light-emitting device 24.

In order to delay occurrence of relaxation oscillations due to threshold deterioration, for example, the driving current indicated by the waveform 45 may be used from a beginning as the average driving current supplied to the light-emitting device 24. When the driving current supplied to the light-emitting device 24 becomes large, however, the light-emitting device 24 deteriorates faster and fails earlier.

The average driving current is set low, for example, within a range of driving current with which the communication apparatus 11 that has received optical signals can obtain optical signals whose reception quality is equal to or higher than a certain threshold. When the extinction ratio ER calculated from the average power $P_{ave}$ and the modulation power $P_{oma}$ measured by the communication apparatus 11 that has received optical signals has become equal to or higher than certain value, the average driving current supplied to the light-emitting device 24 of the communication apparatus 11 that has transmitted the optical signals is increased. As a result, deterioration of the reception quality can be suppressed in the case of threshold deterioration of the light-emitting device 24, and the life of the light-emitting device 24 can be extended.

If the relationship between a driving current and optical outputs changes from the line 40 to a line 46 due to efficiency deterioration of the light-emitting device 24 as illustrated in FIG. 5, and if the driving current indicated by the waveform 41 is supplied to the light-emitting device 24, for example, optical signals indicated by a waveform 47 are output from the light-emitting device 24. If the efficiency of the light-emitting device 24 deteriorates, for example, the average power $P_{ave}$ of optical signals decreases as indicated by the waveform 47 in FIG. 5, and the amplitude of the optical signals, that is, the modulation power $P_{oma}$, decreases. In the case of the efficiency deterioration of the light-emitting device 24, the extinction ratio ER of optical signals hardly changes.

As the modulation power $P_{oma}$ of optical signals decreases, reception quality at the communication apparatus 11 that has received optical signals deteriorates. In the present embodiment, therefore, the amplitude of driving current is increased in the optical transceiver 20 that has transmitted optical signals so that the modulation power $P_{oma}$ of optical signals received by the optical transceiver 20 that has received the optical signals becomes equal to or larger than a certain value. In the example illustrated in FIG. 5, the amplitude of the driving current supplied to the light-emitting device 24 increases from $I_{oma}$ to $I_{oma}'$, and a driving current indicated by a waveform 48 is supplied to the light-emitting device 24. As a result, the light-emitting device 24 outputs optical signals indicated by a waveform 49. In the waveform 49, the modulation power $P_{oma}$ is larger than in the waveform 47.

Because the average power $P_{ave}$ of optical signals also decreases in the efficiency deterioration of the light-emitting device 24, the optical outputs can become too small at the low level if the modulation power $P_{oma}$ increases. Deterioration of the reception quality due to a decrease in the modulation power $P_{oma}$ can therefore be suppressed in the optical transceiver 20 that has received optical signals, but an effect of relaxation oscillations upon optical signals increases as indicated by the waveform 49. The reception quality, therefore, deteriorates at the communication apparatus 11 that has received optical signals.

Although the modulation power $P_{oma}$ has increased in optical signal indicated by the waveform 49, the average power $P_{ave}$ is substantially the same as the average power of optical signal indicated by the waveform 47, and the extinction ratio ER is higher than in the optical signals indicated by the waveform 47. In the present embodiment, therefore, the average driving current supplied to the light-emitting device 24 is increased as illustrated in FIG. 4. In the example illustrated in FIG. 5, the average driving current supplied to the light-emitting device 24 is increased by $\Delta I_{ave}$. As a result, a driving current indicated by a waveform 50 is supplied to the light-emitting device 24, and, even if efficiency deterioration occurs, the light-emitting device 24 outputs the optical signals indicated by the waveform 42.

When the optical transceiver 20 that has transmitted optical signals is to measure the average power $P_{ave}$ and the modulation power $P_{oma}$ of optical signals, a light-receiving device for measuring optical signals is provided in the optical transceiver 20 separately from the light-receiving device 28 that receives optical signals from a corresponding optical transceiver 20. In particular, when the modulation power $P_{oma}$ is measured, the power of optical signals at the low level and the power of optical signals at the high level are separately measured. A light-receiving device having such a high response speed is small and accordingly a light-receiving surface thereof is also small, optical components such as a lens for guiding optical signals to the light-receiving surface are large. It might therefore be difficult to reduce the optical transceivers 20 in size. In addition, a light-receiving device having a high response speed is generally expensive. The optical transceivers 20, therefore, become undesirably costly.

The average power $P_{ave}$ and the modulation power $P_{oma}$ of optical signals are measured, for example, by the light-receiving device 28 provided for the optical transceiver 20 in the communication apparatus 11 that has received optical signals. As a result, a dedicated light-receiving device for measuring the average power $P_{ave}$ and the modulation power $P_{oma}$ of optical signals does not have to be provided for each optical transceiver 20 separately from the light-receiving device 28 that receives optical signals from a corresponding optical transceiver 20. The optical transceivers 20, therefore, can be reduced in size and cost.

Figure 6:
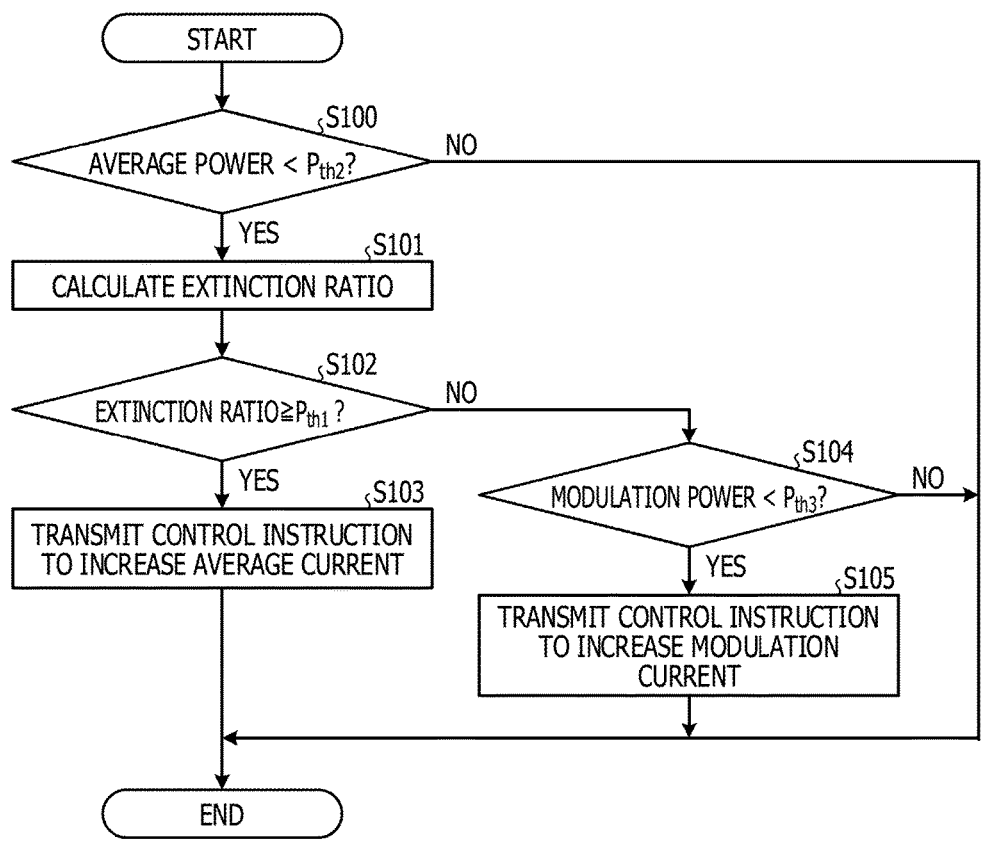
FIG. 6 illustrates an example of an operation performed by the optical transceiver in relation to reception of optical signals.

FIG. 6 illustrates an example of an operation performed by the optical transceiver 20 in relation to reception of optical signals. The optical transceiver 20 starts the operation illustrated in this flowchart after, for example, receiving optical signals from the optical transceiver 20 that has transmitted the optical signals through the optical fiber 15.

The light-receiving device 28 converts the optical signals transmitted from the other optical transceiver 20 through the optical fiber 15 and the optical component 27 into electrical signals, and the amplification unit 29 amplifies the electrical signals. The measuring unit 30 measures the average power $P_{ave}$ and the modulation power $P_{oma}$ of the optical signals based on the electrical signals amplified by the amplification unit 29 and outputs results of the measurement to the determination unit 214. The determination unit 214 determines, based on the results of the measurement output from the measuring unit 30, whether the average power $P_{ave}$ of the optical signals received by the light-receiving device 28 is smaller than the certain threshold $P_{th2}$ (S100).

If the average power $P_{ave}$ is equal to or larger than the threshold $P_{th2}$ (NO in S100), the optical transceiver 20 ends the operation illustrated in the flowchart. As described in FIGS. 4 and 5, for example, the average power $P_{ave}$ decreases due to deterioration of the light-emitting device 24, regardless of whether the deterioration is threshold deterioration or efficiency deterioration. If the average power $P_{ave}$ of the optical signals is equal to or larger than the threshold $P_{th2}$, therefore, neither threshold deterioration nor efficiency deterioration is yet in an advanced stage, and the optical transceiver 20 does not adjust the driving current supplied to the light-emitting device 24. As a result, an increase in the driving current supplied to the light-emitting device 24 can be suppressed, which extends the life of the light-emitting device 24.

If the average power $P_{ave}$ is smaller than the threshold $P_{th2}$ (YES in S100), the determination unit 214 calculates the extinction ratio ER of the optical signals received by the light-receiving device 28 based on expression (1) (S101). The determination unit 214 then determines whether the calculated extinction ratio ER is equal to or higher than the certain threshold $P_{th1}$ (S102).

If the extinction ratio ER is equal to or higher than the threshold $P_{th1}$ (YES in S102), the determination unit 214 outputs, to the communication unit 215, a control instruction to increase average current. The communication unit 215 adds a header or the like to the control instruction output from the determination unit 214 to obtain a control signal in a certain format and outputs the obtained control signal to the communication interface 14. The communication interface 14 transmits the control signal including the control instruction to the communication apparatus 11 that has transmitted the optical signals through the communication cables 16 and the communication network 17 (S103). The optical transceiver 20 ends the operation illustrated in the flowchart.

If the extinction ratio ER is lower than the threshold $P_{th1}$ (NO in S102), on the other hand, the determination unit 214 determines whether the modulation power $P_{oma}$ is smaller than the certain threshold $P_{th3}$ (S104). If the modulation power $P_{oma}$ is equal to or larger than the threshold $P_{th3}$ (NO in S104), the optical transceiver 20 ends the operation illustrated in the flowchart.

If the modulation power $P_{oma}$ is smaller than the threshold $P_{th3}$ (YES in S104), the determination unit 214 outputs, to the communication unit 215, a control instruction to increase modulation current. The communication unit 215 adds a header or the like to the control instruction output from the determination unit 214 to obtain a control signal in a certain format and outputs the obtained control signal to the communication interface 14. The communication interface 14 transmits, through the communication cables 16 and the communication network 17, the control signal including the control instruction to the communication apparatus 11 that has transmitted the optical signals (S105). The optical transceiver 20 ends the operation illustrated in the flowchart.

Figure 7:
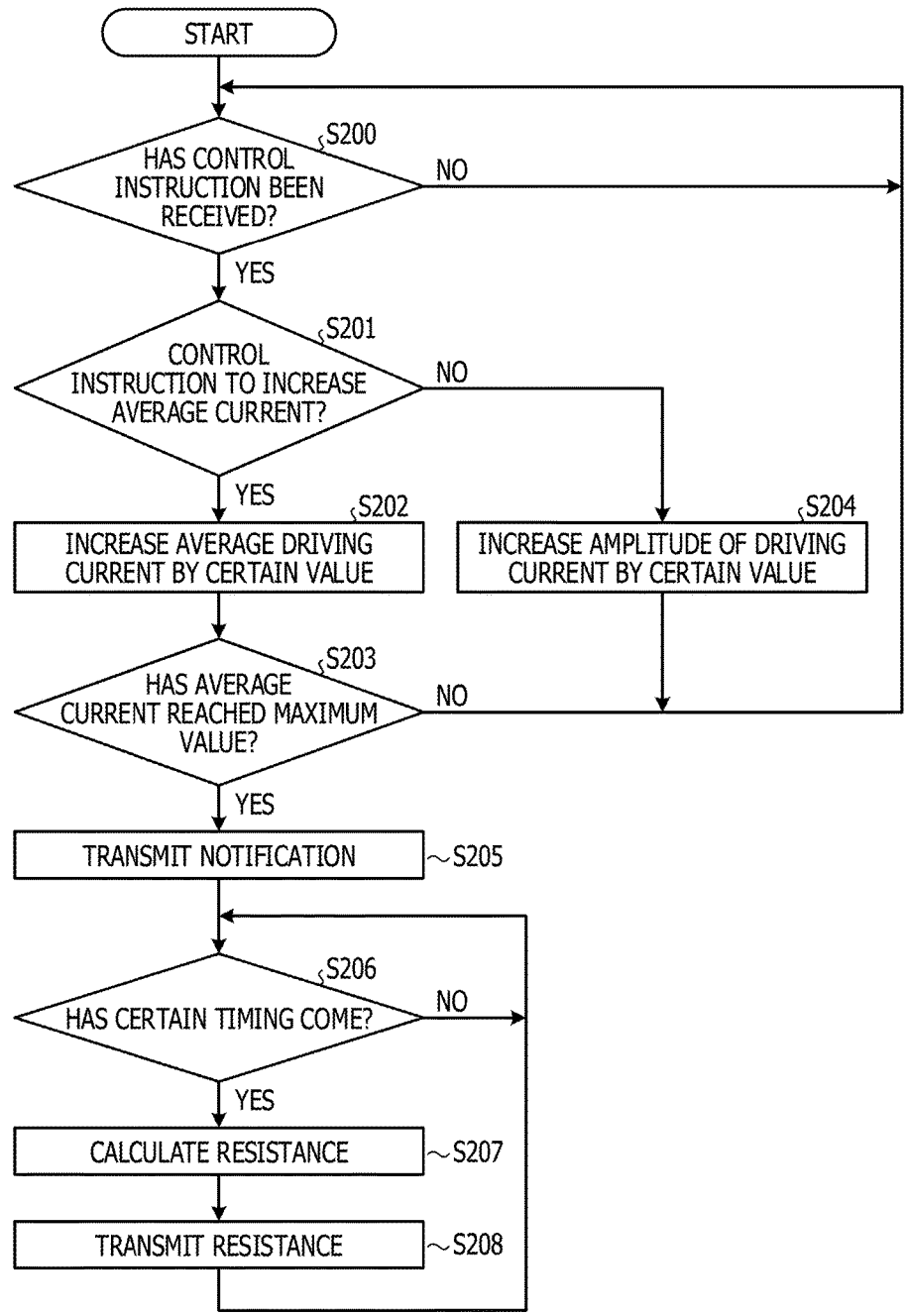
FIG. 7 illustrates an example of an operation performed by the optical transceiver in relation to transmission of optical signals.

FIG. 7 illustrates an example of an operation performed by the optical transceiver 20 in relation to transmission of optical signals. The optical transceiver 20 starts the operation illustrated in this flowchart at a certain timing such as after the optical transceiver 20 is turned on.

The adjustment unit 212 determines whether the communication unit 215 has output a control instruction in order to determine whether the adjustment unit 212 has received, through the communication cables 16 and the communication network 17, a control instruction from the other optical transceiver 20 that has received optical signals (S200). If receiving a control instruction (YES in S200), the adjustment unit 212 determines whether the received control instruction is a control instruction to increase average current (S201).

If the received control instruction is not a control instruction to increase average current (NO in S201), that is, if the received control instruction is a control instruction to increase modulation current, for example, the adjustment unit 212 instructs the driver IC 23 to increase the modulation current. The driver IC 23 increases the amplitude of the driving current supplied to the light-emitting device 24 by a certain value in accordance with the instruction to increase the modulation current received from the adjustment unit 212 (S204). The adjustment unit 212 then performs the processing in operation S200 again.

If the received control instruction is a control instruction to increase average current (YES in S201), the adjustment unit 212 instructs the driver IC 23 to increase the average current. The driver IC 23 adjusts the driving current supplied to the light-emitting device 24 in accordance with the instruction to increase average current received from the adjustment unit 212 such that an average driving current increases by a certain value (S202).

The adjustment unit 212 determines whether the average current supplied to the light-emitting device 24 has reached an allowable maximum value of the average driving current for the light-emitting device 24 (S203). If the average current supplied to the light-emitting device 24 has not reached the maximum value (NO in S203), the adjustment unit 212 performs the processing in operation S200 again.

If the average current supplied to the light-emitting device 24 has reached the maximum value (YES in S203), the adjustment unit 212 outputs, to the communication unit 215, a notification indicating the optical transceiver 20 in which the average current supplied to the light-emitting device 24 has reached the maximum value. The adjustment unit 212 then instructs the resistance calculation unit 213 to monitor the resistance of the light-emitting device 24. The communication unit 215 adds a header or the like to the notification output from the adjustment unit 212 to obtain a notification signal in a certain format and outputs the obtained notification signal to the communication interface 14. The communication interface 14 transmits the notification signal output from the communication unit 215 to the management apparatus through the communication cables 16 and the communication network 17 (S205).

The resistance calculation unit 213 determines whether a certain timing has come (S206). If the certain timing has come (YES in S206), the resistance calculation unit 213 calculates the resistance of the light-emitting device 24 based on results of measurement output from the sensor 26 (S207). The resistance calculation unit 213 outputs, to the communication unit 215, a notification including information regarding the calculated resistance of the light-emitting device 24. The communication unit 215 adds a header or the like to the notification output from the resistance calculation unit 213 to obtain a notification signal in a certain format and outputs the obtained notification signal to the communication interface 14. The communication interface 14 transmits the notification signal output from the communication unit 215 to the management apparatus through the communication cables 16 and the communication network 17 (S208). The resistance calculation unit 213 performs the processing in operation S206 again.

As described above, the optical communication system 10 includes the plurality of optical transceivers 20 that communicate optical signals with each other through the optical fiber 15. The optical transceivers 20 each include the light-receiving device 28, the measuring unit 30, the light-emitting device 24, the driver IC 23, and the adjustment unit 212. The light-receiving device 28 receives optical signals transmitted from the other optical transceiver 20 and converts the optical signals into electrical signals. The measuring unit 30 measures the average power $P_{ave}$ and the modulation power $P_{oma}$ of the optical signals based on the electrical signals obtained by the light-receiving device 28. The light-emitting device 24 emits light in accordance with a driving current to transmit optical signals to the other optical transceiver 20. The driver IC 23 controls the driving current supplied to the light-emitting device 24 in accordance with transmission signals in order to cause the light-emitting device 24 to transmit optical signals according to the transmission signals. The adjustment unit 212 adjusts the driving current controlled by the driver IC 23 based on the average power $P_{ave}$ and the modulation power $P_{oma}$ measured by the measuring unit 30 included in the other optical transceiver 20. As a result, the life of the light-emitting device 24 of the optical transceiver 20 can be extended with a simple configuration.

Each of the optical transceivers 20 also includes the determination unit 214 and the communication unit 215. The determination unit 214 determines whether the extinction ratio ER calculated from the average power $P_{ave}$ and the modulation power $P_{oma}$ measured by the measuring unit 30 is equal to or higher than the threshold $P_{th1}$. If the determination unit 214 determines that the extinction ratio ER is equal to or higher than the threshold $P_{th1}$, the communication unit 215 transmits, to the other optical transceiver 20, a control signal to increase average current. If the adjustment unit 212 receives, from the other optical transceiver 20, a control instruction to increase average current, the adjustment unit 212 adjusts the driving current supplied to the light-emitting device 24 such that an average driving current increases. As a result, deterioration of the quality of optical signals due to threshold deterioration of the light-emitting device 24 or the like can be suppressed.

If the average power $P_{ave}$ measured by the measuring unit 30 is smaller than the threshold $P_{th2}$ in each of the optical transceivers 20, the determination unit 214 calculates the extinction ratio ER. As a result, a processing load of the optical transceiver 20 can be reduced.

If the extinction ratio ER is lower than the threshold $P_{th1}$ in each of the optical transceivers 20, the determination unit 214 also determines whether the modulation power $P_{oma}$ measured by the measuring unit 30 is smaller than the threshold $P_{th3}$. If the determination unit 214 determines that the modulation power $P_{oma}$ is smaller than the threshold $P_{th3}$, the communication unit 215 transmits, to the other optical transceiver 20, a control instruction to increase a modulation current supplied to the light-emitting device 24. If receiving, from the other optical transceiver 20, a control instruction to increase modulation current, the adjustment unit 212 adjusts the amplitude of the driving current supplied to the light-emitting device 24 such that the amplitude of optical signals output from the light-emitting device 24 increases. As a result, deterioration of reception quality at the optical transceiver 20 that has received optical signals due to efficiency deterioration of the light-emitting device 24 can be suppressed.

If, in each of the optical transceivers 20, an average driving current adjusted based on the average power $P_{ave}$ measured by the measuring unit 30 included in the other optical transceiver 20 has reached an allowable maximum value of average driving current for the light-emitting device 24, the adjustment unit 212 maintains the driving current regardless of a control instruction to be received from the other optical transceiver 20 thereafter such that the average driving current supplied to the light-emitting device 24 becomes the maximum value. As a result, the adjustment unit 212 can inhibit an excessive driving current from being supplied to the light-emitting device 24.

In the optical communication system 10, the two optical transceiver 20 that communicate optical signals communicate control instructions. An optical communication system 10 according to a second embodiment is different from the optical communication system 10 according to the first embodiment in that an optical transceiver 20 that has received optical signals transmits a control instruction to a server and the server transfers the control instruction to an optical transceiver 20 that has transmitted the optical signals.

Figure 8:
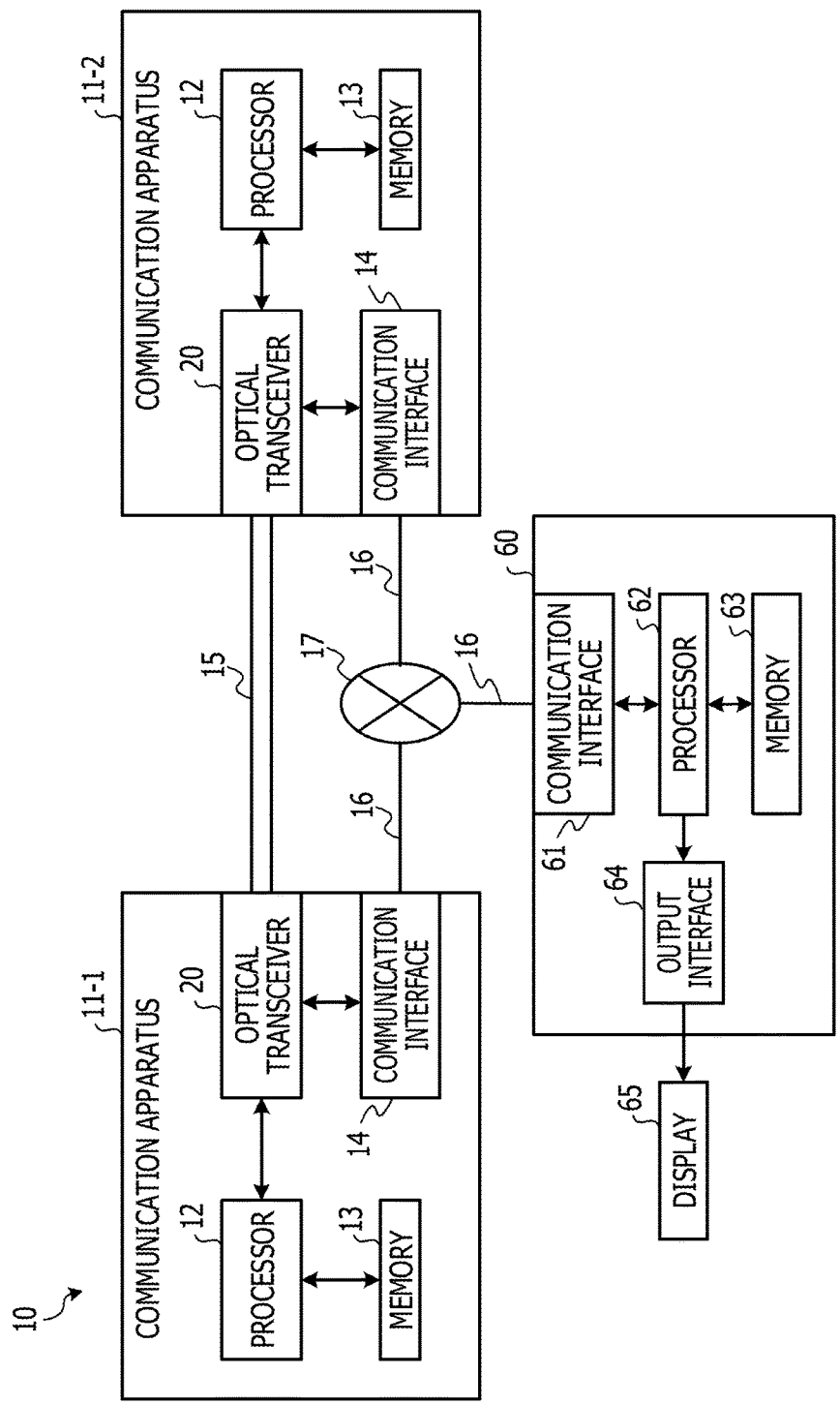
FIG. 8 illustrates an example of the optical communication system.

FIG. 8 illustrates an example of the optical communication system 10. The optical communication system 10 illustrated in FIG. 8 includes the communication apparatuses 11-1 and 11-2 and a server 60. The server 60 is an example of a management apparatus. In FIG. 8, blocks having the same reference numerals as in FIG. 1 are the same as the blocks described with reference to FIG. 1 unless otherwise noted, and detailed description thereof is omitted.

The optical transceiver 20 of each communication apparatus 11 measures the average power and the like of optical signals transmitted from the other communication apparatus 11 through the optical fiber 15, for example, and generates a measurement signal indicating results of the measurement. The optical transceiver 20 transmits the generated measurement signal to the server 60 through the communication interface 14. If receiving a control instruction from the server 60 through the communication interface 14, the optical transceiver 20 adjusts, based on the received control instruction, a driving current supplied to the light-emitting device 24 that emits optical signals.

The server 60 includes a communication interface 61, a processor 62, a memory 63, and an output interface 64. The communication interface 61 is connected to the communication network 17 through a communication cable 16. The communication interface 61 receives measurement signals and notification signals transmitted from the communication apparatuses 11 through the communication network 17 and outputs the received measurement signals and notification signals to the processor 62. The communication interface 61 transmits, through the communication network 17, a control signal output from the processor 62 to a communication apparatus 11 that is a destination of the control signal.

The processor 62 includes, for example, a CPU, an FPGA, a DSP, or the like. The memory 63 includes a RAM, a ROM, or the like, for example, and stores programs, data, and the like used by the processor 62 to perform processing. A display 65 is connected to the output interface 64. The processor 62 executes a program read from the memory 63 to perform a certain type of processing, for example, and displays a result of the processing on the display 65 through the output interface 64. The output interface 64 is an example of an output unit. The display 65 is an example of an output device.

Figure 9:
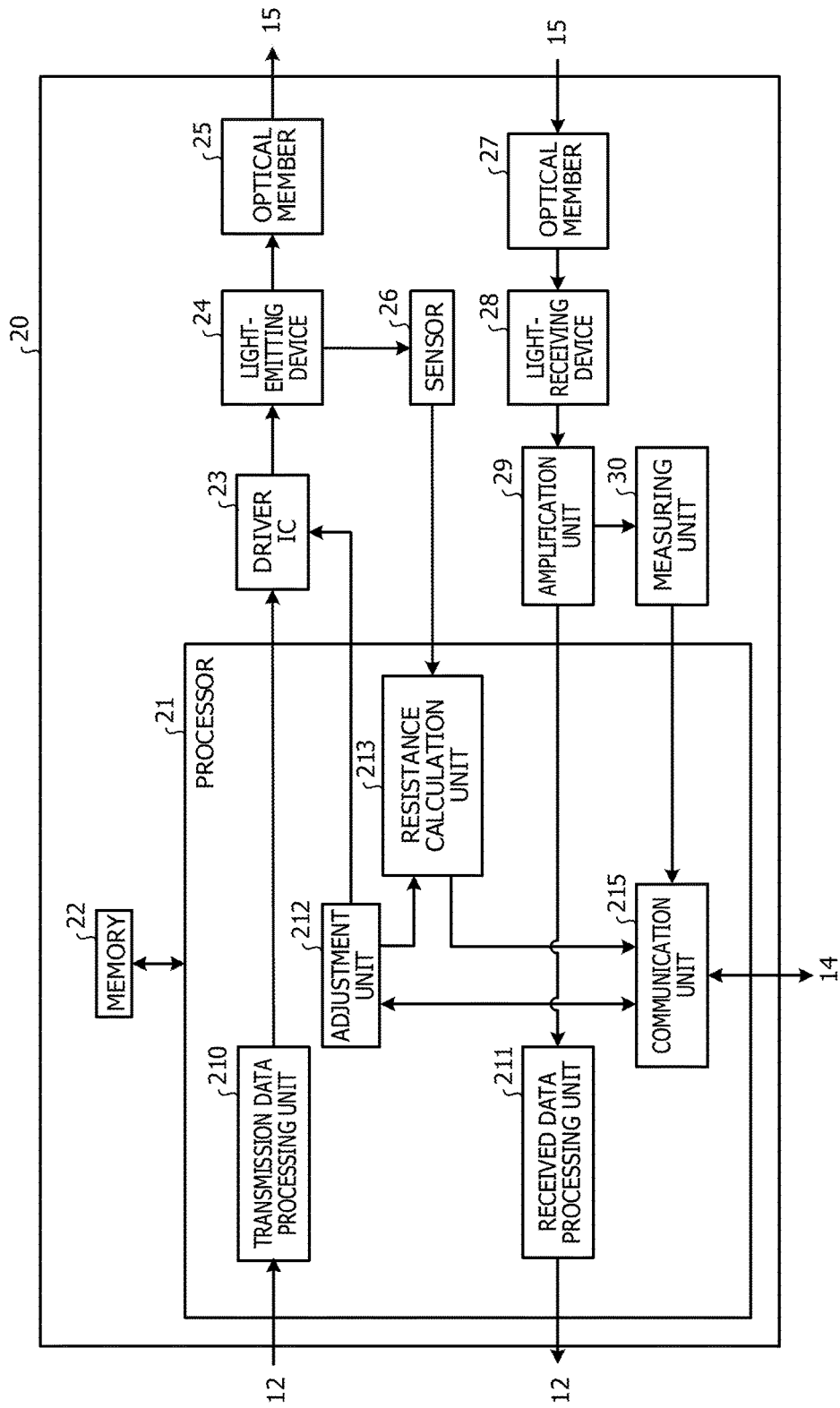
FIG. 9 illustrates an example of the optical transceiver.

FIG. 9 illustrates an example of the optical transceiver 20. The optical transceiver 20 illustrated in FIG. 9 includes, as illustrated in FIG. 9, for example, the processor 21, the memory 22, the driver IC 23, the light-emitting device 24, the optical component 25, the sensor 26, the optical component 27, the light-receiving device 28, the amplification unit 29, and the measuring unit 30. The processor 21 executes the programs read from the memory 22, for example, to achieve the functions of the transmission data processing unit 210, the received data processing unit 211, the adjustment unit 212, the resistance calculation unit 213, and the communication unit 215. In FIG. 9, the blocks having the same reference numerals as in FIG. 2 are the same as the blocks described with reference to FIG. 2 unless otherwise noted, and detailed description thereof is omitted.

Results of measurement output from the measuring unit 30 are converted from analog signals into digital signals and input to the communication unit 215. The communication unit 215 adds a header or the like to the results of measurement output from the measuring unit 30 to obtain a measurement signal in a certain format and outputs the obtained measurement signal to the communication interface 14. The communication interface 14 transmits the measurement signal output from the communication unit 215 to the server 60 through the communication cables 16 and the communication network 17. If receiving a control signal from the server 60 through the communication interface 14, the communication unit 215 extracts a control instruction included in the received control signal and outputs the extracted control instruction to the adjustment unit 212. If receiving a notification output from the adjustment unit 212 or the resistance calculation unit 213, the communication unit 215 adds a header or the like to the notification to obtain a notification signal in a certain format and outputs the obtained notification signal to the communication interface 14. The communication interface 14 transmits the notification signal to the server 60 through the communication cables 16 and the communication network 17. The communication unit 215 is an example of a second transmission unit.

Figure 10:
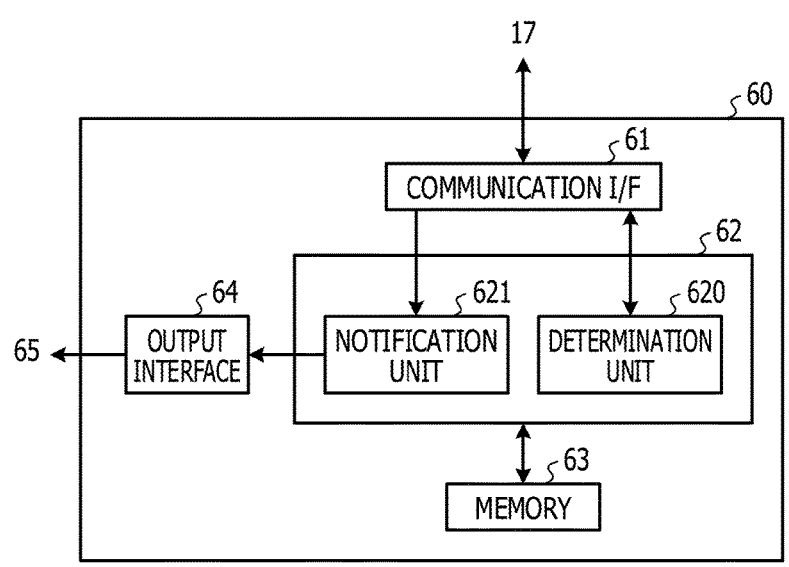
FIG. 10 illustrates an example of a server.

FIG. 10 illustrates an example of the server 60.

If receiving, through the communication cables 16 and the communication network 17, a measurement signal from the optical transceiver 20 that has received optical signals, the communication interface 61 outputs results of measurement included in the received measurement signal to the processor 62. If receiving a control instruction output from the processor 62, the communication interface 61 adds a header or the like to the control instruction to obtain a control signal in a certain format and transmits, through the communication cables 16 and the communication network 17, the obtained control signal to the optical transceiver 20 that has transmitted optical signals. If receiving, through the communication cables 16 and the communication network 17, a notification signal from the optical transceiver 20 that has transmitted optical signals, the communication interface 61 outputs a notification included in the received notification signal to the processor 62. The communication interface 61 is an example of a first transmission unit.

The processor 62 executes the programs read from the memory 63, for example, to achieve functions of a determination unit 620 and a notification unit 621. The determination unit 620 determines, based on results of measurement received through the communication interface 61, whether the average power $P_{ave}$ of optical signals received by the light-receiving device 28 of the optical transceiver 20 that has received optical signals is smaller than the certain threshold $P_{th2}$. Data regarding the threshold $P_{th2}$ is saved to the memory 63, for example, in advance.

If the average power $P_{ave}$ is smaller than the threshold $P_{th2}$, the determination unit 620 calculates the extinction ratio ER of the optical signals based on the average power $P_{ave}$ and the modulation power $P_{oma}$ included in the results of measurement received through the communication interface 61 using expression (1). The determination unit 620 then determines whether the extinction ratio ER is equal to or higher than the certain threshold $P_{th1}$. Data regarding the threshold $P_{th1}$ is saved to the memory 63, for example, in advance.

If the extinction ratio ER is equal to or higher than the threshold $P_{th1}$, the determination unit 620 outputs, to the communication interface 61, a control instruction to increase average current. The communication interface 61 transmits, through the communication cables 16 and the communication network 17, the control instruction to increase average current to the optical transceiver 20 that has transmitted optical signals. If the extinction ratio ER is lower than the threshold $P_{th1}$, on the other hand, the determination unit 620 determines whether the modulation power $P_{oma}$ is smaller than the certain threshold $P_{th3}$. Data regarding the threshold $P_{th3}$ is saved to the memory 63, for example, in advance. If the modulation power $P_{oma}$ is smaller than the threshold $P_{th3}$, the determination unit 620 outputs, to the communication interface 61, a control instruction to increase modulation current. The communication interface 61 transmits, through the communication cables 16 and the communication network 17, the control instruction to increase modulation current to the optical transceiver 20 that has transmitted optical signals.

The notification unit 621 displays a notification output from the communication interface 61 on the display 65 through the output interface 64 along with information regarding an optical transceiver 20 including the light-emitting device 24 that is a target of the notification. Notifications to be displayed on the display 65 in the present embodiment include a notification indicating that the light-emitting device 24 of the optical transceiver 20 that has transmitted optical signals has reached the maximum value and a notification including information indicating the resistance of the light-emitting device 24. By referring to a notification displayed on the display 65, the manager who manages the states of the optical transceivers 20 of the communication apparatuses 11 can understand how severely the light-emitting device 24 of an optical transceiver 20 has deteriorated. Alternatively, the notification unit 621 may output, through the output interface 64, a notification output from the communication interface 61 to another output apparatus such as a printer or a computer of another server or the like.

Figure 11:
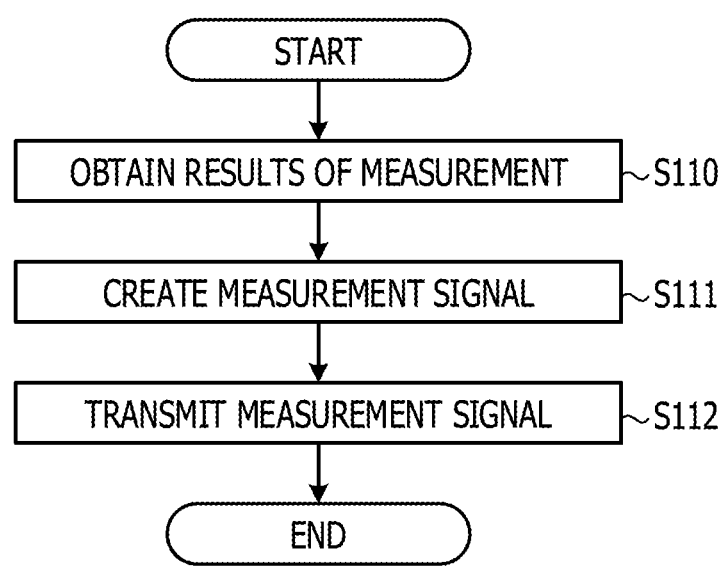
FIG. 11 illustrates an example of an operation performed by the optical transceiver in relation to reception of optical signals.

FIG. 11 illustrates an example of an operation performed by the optical transceiver 20 in relation to reception of optical signals. If receiving, through the optical fiber 15, optical signals from the optical transceiver 20 that has transmitted the optical signals, the optical transceiver 20 starts the operation illustrated in this flowchart. The optical transceiver 20 may start the operation illustrated in the flowchart at certain timings (e.g., at intervals of several seconds to several minutes).

The light-receiving device 28 converts the optical signals transmitted from the other optical transceiver 20 through the optical fiber 15 and the optical component 27 into electrical signals, and the amplification unit 29 amplifies the electrical signals. The measuring unit 30 measures the average power $P_{ave}$ and the modulation power $P_{oma}$ of the optical signals based on the electrical signals amplified by the amplification unit 29. The communication unit 215 obtains results of the measurement performed by the measuring unit 30 (S110).

The communication unit 215 adds a header or the like to the obtained results of the measurement to obtain a measurement signal in a certain format (S111). The communication unit 215 then outputs the generated measurement signal to the communication interface 14. The communication interface 14 transmits, to the server 60 through the communication cables 16 and the communication network 17, the measurement signal output from the communication unit 215 (S112).

The operation of the optical transceiver 20 according to the second embodiment in relation to transmission of optical signals is the same as that described with reference to FIG. 7 except that the server 60 transmits a control instruction and a notification signal is transmitted to the server 60, and detailed description thereof is omitted.

Figure 12:
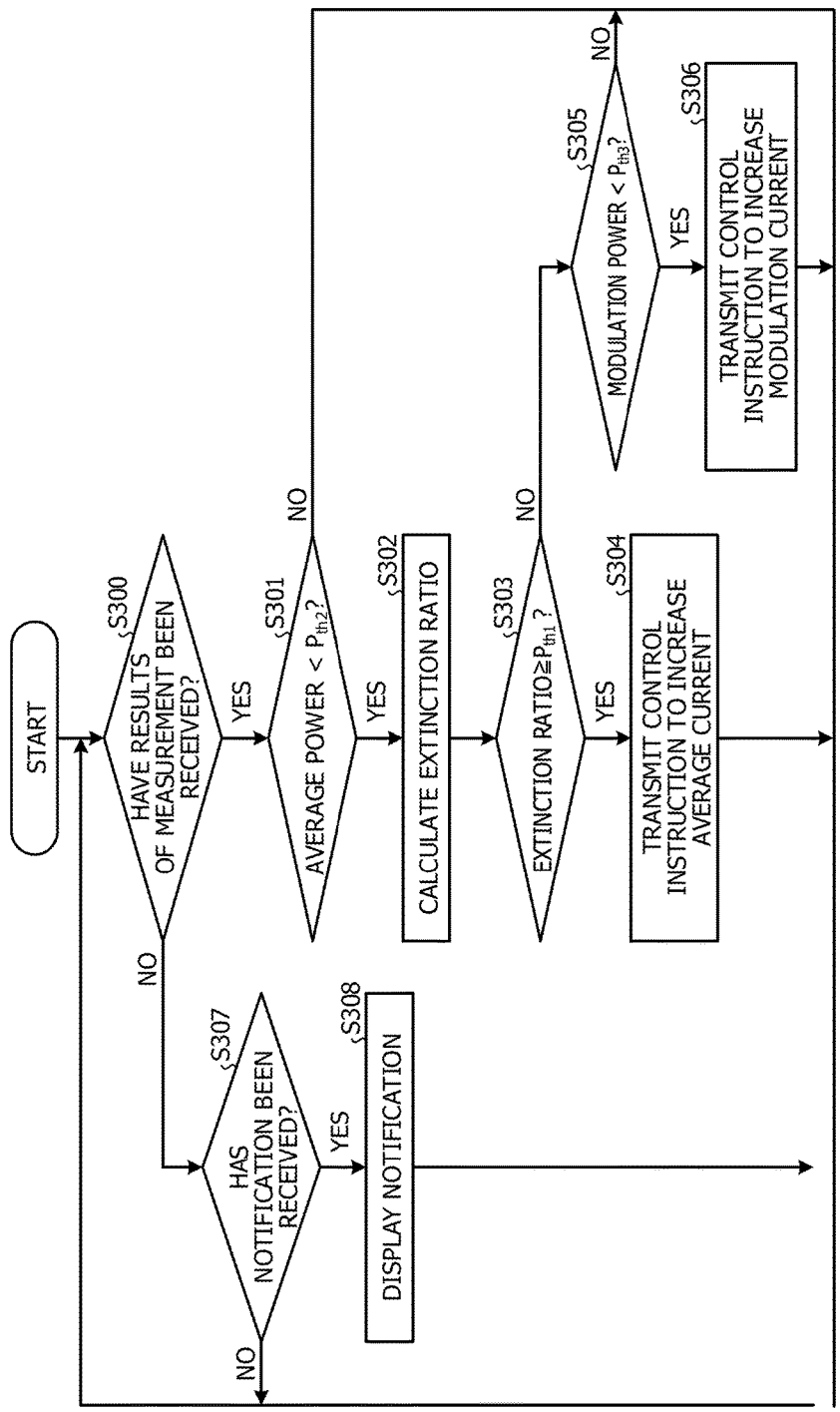
FIG. 12 illustrates an example of an operation performed by the server.

FIG. 12 illustrates an example of an operation performed by the server 60. The server 60 starts the operation illustrated in this flowchart at a certain timing such as after the server 60 is turned on.

The determination unit 620 determines whether results of measurement have been received through the communication interface 61 (S300). If results of measurement have been received (YES in S300), the determination unit 620 determines, based on the received results of measurement, whether the average power $P_{ave}$ of optical signals received by the light-receiving device 28 of the optical transceiver 20 that has received the optical signals is smaller than the certain threshold $P_{th2}$ (S301). If the average power $P_{ave}$ is equal to or larger than the threshold $P_{th2}$ (NO in S301), the determination unit 620 performs the processing in operation S300 again.

If the average power $P_{ave}$ is smaller than the threshold $P_{th2}$ (YES in S301), the determination unit 620 calculates the extinction ratio ER of the optical signals based on the average power $P_{ave}$ and the modulation power $P_{oma}$ included in the results of measurement using expression (1) (S302). The determination unit 620 determines whether the extinction ratio ER is equal to or higher than the certain threshold $P_{th1}$ (S303).

If the extinction ratio ER is equal to or higher than the threshold $P_{th1}$ (YES in S303), the determination unit 620 outputs, to the communication interface 61, a control instruction to increase average current. The communication interface 61 transmits, through the communication cables 16 and the communication network 17, the control instruction to increase average current to the optical transceiver 20 that has received the optical signals (S304). The determination unit 620 then performs the processing in operation S300 again.

If the extinction ratio ER is lower than the threshold $P_{th1}$ (NO in S303), the determination unit 620 determines whether the modulation power $P_{oma}$ is smaller than the certain threshold $P_{th3}$ (S305). If the modulation power $P_{oma}$ is equal to or larger than the threshold $P_{th3}$ (NO in S305), the determination unit 620 performs the processing in operation S300 again.

If the modulation power $P_{oma}$ is smaller than the threshold $P_{th3}$ (YES in S305), the determination unit 620 outputs, to the communication interface 61, a control instruction to increase modulation current. The communication interface 61 transmits, through the communication cables 16 and the communication network 17, a control instruction to increase modulation current to the optical transceiver 20 that has transmitted the optical signals (S306). The determination unit 620 performs the processing in operation S300 again.

If results of measurement have not been received (NO in S300), the notification unit 621 determines whether a notification has been received through the communication interface 61 (S307). If a notification has not been received through the communication interface 61 (NO in S307), the determination unit 620 performs the processing in operation S300 again. If a notification has been received through the communication interface 61 (YES in S307), the notification unit 621 displays the received notification on the display 65 through the output interface 64 along with information regarding an optical transceiver 20 including a light-emitting device 24 that is a target of the notification (S308). The determination unit 620 performs the processing in operation S300 again.

The optical communication system 10 illustrated in FIG. 8 includes the plurality of optical transceivers 20 and the server 60. The server 60 includes the determination unit 620 and the communication interface 61. The determination unit 620 determines whether the extinction ratio ER calculated from the average power $P_{ave}$ and the modulation power $P_{oma}$ measured by the measuring unit 30 included in the optical transceiver 20 that has received optical signals is equal to or higher than the threshold $P_{th1}$. If the determination unit 620 determines that the extinction ratio ER is equal to or higher than the threshold $P_{th1}$, the communication interface 61 transmits, to the optical transceiver 20 that has transmitted the optical signals, a control instruction to increase average current. Upon receiving the control instruction to increase average current from the server 60, the adjustment unit 212 of the optical transceiver 20 that has transmitted the optical signals adjusts a driving current supplied to the light-emitting device 24 such that an average driving current increases. As a result, the life of the light-emitting device 24 of the optical transceiver 20 can be extended with a simple configuration. In addition, since the server 60 singlehandedly performs the processes such as the determination and the calculation of the extinction ratio ER, processing loads of the optical transceivers 20 can be reduced.

Figure 13:
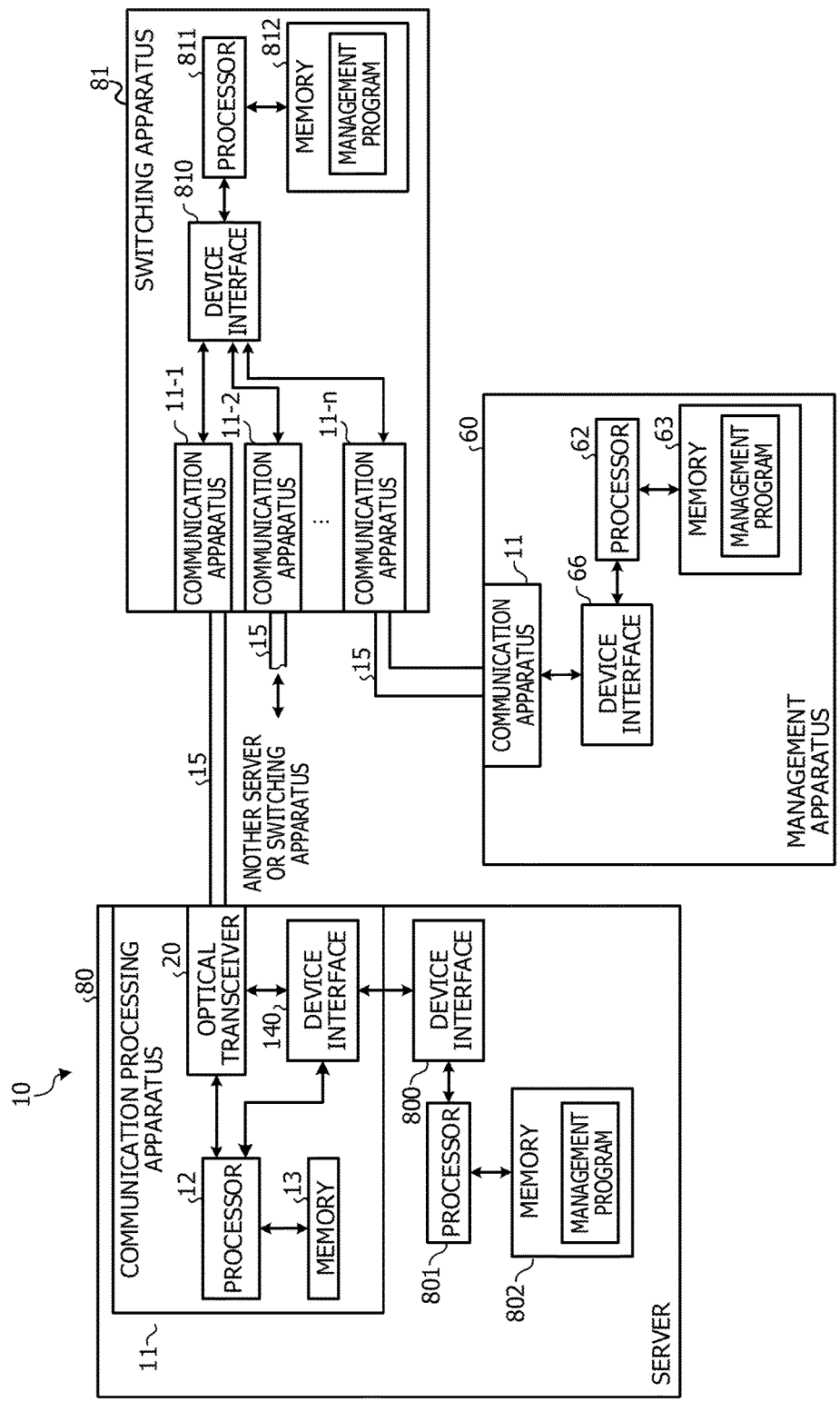
FIG. 13 illustrates an example of the optical communication system.

Although the communication interfaces 14 dedicated to communicating information regarding the corresponding optical transceivers 20 with the server 60 are provided for the communication apparatuses 11 in the above description, the information regarding the optical transceivers 20 may be communicated through the optical fiber 15, instead, as illustrated in FIG. 13. FIG. 13 illustrates an example of the optical communication system 10. An optical communication system 10 illustrated in FIG. 13 includes a plurality of servers 80, a plurality of switching apparatuses 81, and a server (management apparatus) 60.

The servers 80 each include the communication apparatus 11, a device interface 800, a processor 801, and a memory 802. In the optical communication system 10 illustrated in FIG. 13, the communication apparatus 11 is, for example, an optical transceiver module provided on an extension board. The communication apparatus 11 illustrated in FIG. 13 is the same as the communication apparatus 11 described in the second embodiment except that the communication apparatus 11 illustrated in FIG. 13 includes a device interface 140 instead of the communication interface 14. The device interface 140 is, for example, a peripheral component interconnect (PCI) bus interface. The device interface 800 is a PCI bus connector, for example, and connected to the device interface 140 of the communication apparatus 11. The processor 801 is a CPU, for example, and reads and executes programs stored in the memory 802 such as a dynamic random-access memory (DRAM) to perform processes specific to the server 80, such as an application process. The memory 802 also stores a management program, and the processor 801 reads and executes the management program stored in the memory 802 to obtain information regarding the optical transceiver 20 of the communication apparatus 11 and transmits the obtained information to the server 60 through the optical transceiver 20.

The switching apparatuses 81 each include a plurality of communication apparatuses 11-1 to 11-n, a device interface 810, a processor 811, and a memory 812. Each switching apparatus 81 is connected to the servers 80, the other switching apparatuses 81, the server 60, and the like through the communication apparatuses 11-1 to 11-n. The configuration of the communication apparatuses 11-1 to 11-n of the switching apparatus 81 is the same as that of the communication apparatus 11 of the server 80. The device interface 810 is a PCI bus connector, for example, and connected to device interfaces 140 included in the communication apparatuses 11-1 to 11-n. The processor 811 is a CPU, for example, and reads and executes programs stored in the memory 812 such as DRAM to perform processes specific to the switching apparatus 81 such as routing. The memory 812 stores a management program, and the processor 811 reads and executes the management program stored in the memory 812 to obtain information regarding optical transceivers 20 included in the communication apparatuses 11-1 to 11-n and transmit the obtained information to the server 60 through the optical transceiver 20 of one of the communication apparatuses 11.

The server 60 includes a communication apparatus 11, a processor 62, a memory 63, and a device interface 66. The server 60 is connected to one of the switching apparatuses 81 through the communication apparatus 11. The configuration of the communication apparatus 11 of the server 60 is the same as that of the communication apparatus 11 of each server 80. The device interface 66 is a PCI bus connector, for example, and connected to a device interface 140 of the communication apparatus 11. The processor 62 is a CPU, for example, and reads and executes a management program stored in the memory 63 such as a DRAM to perform processes specific to the server 60, such as collection of information regarding the optical transceivers 20 included in the communication apparatuses 11 of the servers 80 and switching apparatuses 81 and control of the optical transceivers 20 based on the collected information.

Since the servers 80, the switching apparatuses 81, and the server 60 are connected to one another through the optical fiber 15, a system such as a data center is built. In the optical communication system 10 illustrated in FIG. 13, the processors 12 of the communication apparatuses 11 are separated from the processors 801, 811, and 62 of the servers 80, the switching apparatuses 81, and the server 60. As a result, processing loads of the processors 12 of the communication apparatus 11 can be reduced. Processors whose processing performance is not very high, therefore, can be used as the processors 12 of the communication apparatuses 11, and the cost, the power consumption, and the size of the communication apparatuses 11 can be reduced.

The life of the light-emitting device 24 of each optical transceiver 20 is estimated based on an average driving current supplied to the light-emitting device 24, for example, and information indicating the estimated life is output to a display or the like. As a result, a manager who manages the optical transceivers 20 of the communication apparatuses 11 can replace the light-emitting devices 24 of the optical transceivers 20 before the light-emitting devices 24 fail, which improves the reliability of the optical communication system 10. The configuration of the optical communication system 10 and the configuration of the optical transceiver 20 are the same as that of the optical communication system 10 illustrated in FIG. 8 and that of the optical transceiver 20 illustrated in FIG. 9, respectively, and detailed description thereof is omitted.

Figure 14:
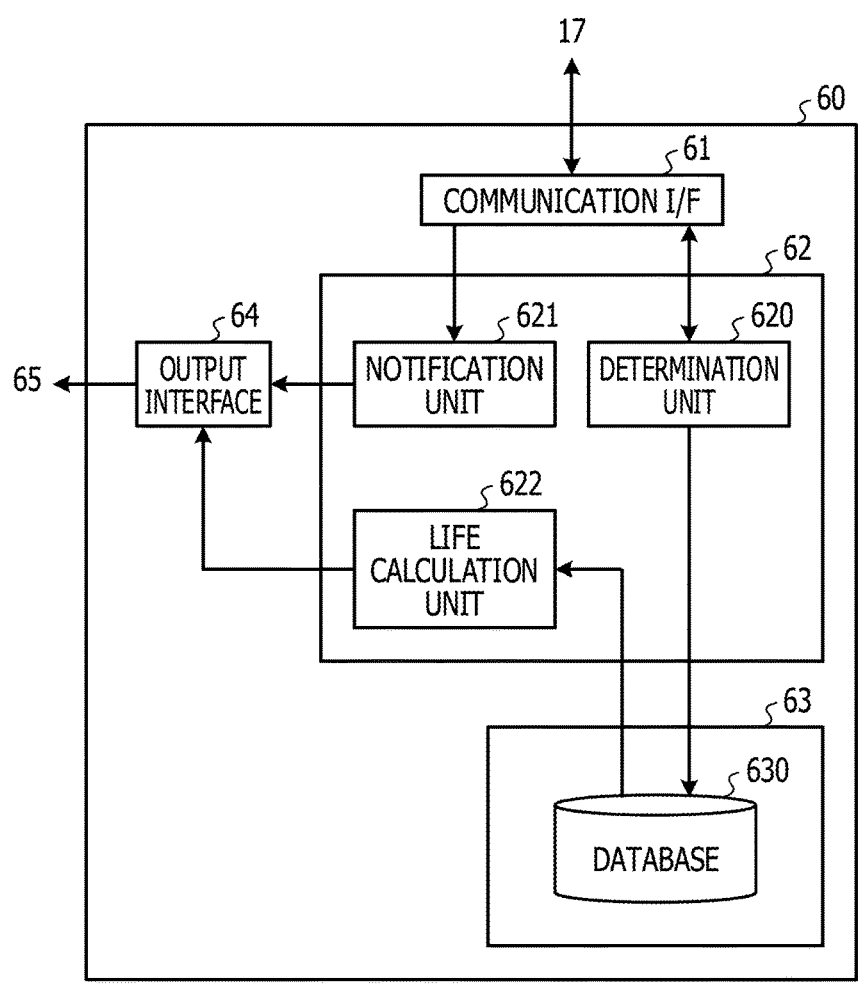
FIG. 14 illustrates an example of the server.

FIG. 14 illustrates an example of a server. A server 60 illustrated in FIG. 14 includes a communication interface 61, a processor 62, a memory 63, and an output interface 64. The processor 62 executes programs read from the memory 63, for example, to achieve functions of a determination unit 620, a notification unit 621, and a life calculation unit 622. In FIG. 14, blocks given the same reference numerals as in FIG. 10 are the same as those described with reference to FIG. 10, and detailed description thereof is omitted.

Figure 15:
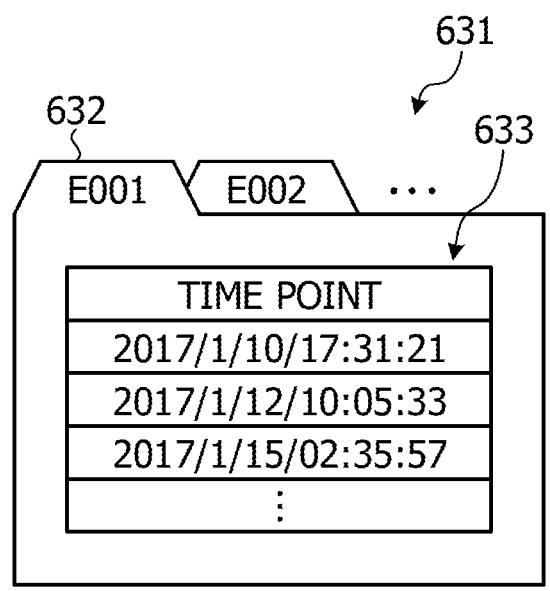
FIG. 15 illustrates an example of a history table.

The memory 63 stores a database 630. The database 630 includes, for example, a history table 631 illustrated in FIG. 15 and a life table 634 illustrated in FIG. 16. FIG. 15 is a diagram illustrating an example of the life table 631. As illustrated in FIG. 15, for example, the history table 631 stores an individual table 633 for each piece of identification information 632 for identifying an optical transceiver 20. The individual tables 633 each include a time point at which a control instruction to increase average current has been transmitted. FIG. 16 is a diagram illustrating an example of the life table 634 according to a third embodiment. As illustrated in FIG. 16, for example, the life table 634 stores information regarding a date of first use, an initial value of average current, and an estimated date of failure associated with identification information 632 regarding each optical transceiver 20. The estimated date of data is an example of information indicating the life of a light-emitting device 24.

The determination unit 620 transmits a control instruction to increase average current to an optical transceiver 20 and then refers to the history table 631 of the database 630 to identify an individual table 633 associated with identification information 632 regarding the optical transceiver 20 to which the control instruction has been transmitted. The determination unit 620 registers, to the identified individual table 633, a time point at which the control instruction has been transmitted.

The life calculation unit 622 calculates the life of the light-emitting device 24 of the optical transceiver 20 that has transmitted optical signals based on the amount of change in a driving current supplied to the light-emitting device 24. When a time point at which a control instruction has been transmitted is newly registered to the individual table 633, for example, the life calculation unit 622 obtains information regarding the time point registered in the individual table 633 and identification information 632 associated with the individual table 633. The life calculation unit 622 extracts, from the life table 634, a date of first use and an initial value of average current associated with the obtained identification information 632. The life calculation unit 622 calculates the life of the light-emitting device 24 of the optical transceiver 20 corresponding to the obtained identification information 632 and identifies a date based on the extracted date of first use and the calculated life as an estimated date of failure. The life calculation unit 622 then updates an estimated date of failure in the life table 634 associated with the obtained identification information 632 using the identified estimated date of failure.

The life of the light-emitting device 24 depends on the average driving current supplied to the light-emitting device 24. If the average driving current supplied to the light-emitting device 24 is an allowable maximum value $I_{limit}$(A) of average driving current supplied to the light-emitting device 24, for example, a period $\tau_{life}$ (hours) indicating the life of the light-emitting device 24 is calculated based on the following expression (2).

$$\tau_{life} = A \times I_{limit}^n \times e^{\frac{E_a}{T_j}} \quad (2)$$

In expression (2), A and n are certain constants, $E_a$ denotes activation energy, and $T_j$ denotes the junction temperature of the light-emitting device 24. When A=1, n=−2, $I_{limit}$=7 mA, $E_a$=0.7 eV, and $T_j$=373 K, for example, the period $\tau_{life}$, which indicates the life of the light-emitting device 24, is about 20,000 hours according to expression (2).

Figure 17:
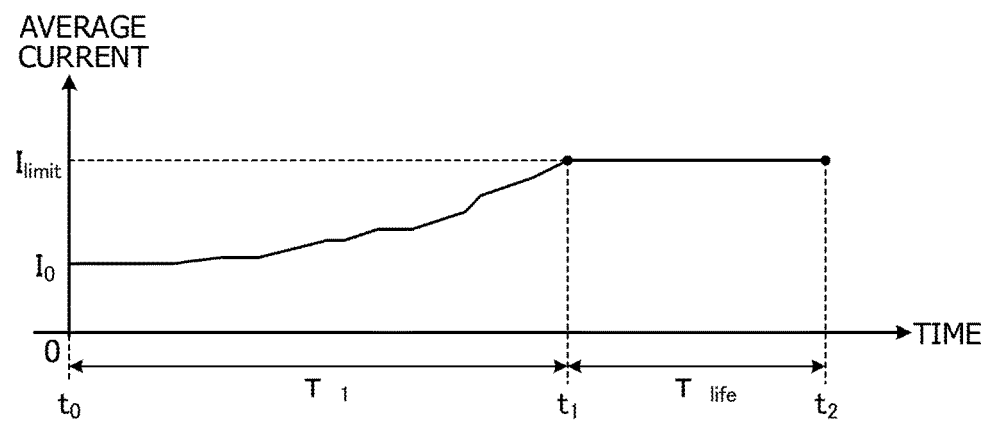
FIG. 17 illustrates an example of a life of a light-emitting device.

As illustrated in FIG. 17, for example, an initial value of the average driving current supplied to the light-emitting device 24 is set to $I_0$, which is smaller than the maximum value $I_{limit}$, and use of the light-emitting device 24 starts at a time point $t_0$. The average driving current supplied to the light-emitting device 24 gradually increases as threshold deterioration and efficiency deterioration of the light-emitting device 24 progress and reaches the maximum value $I_{limit}$ at a time point $t_1$. The light-emitting device 24 continues to be used with the average driving current supplied to the light-emitting device 24 kept at the maximum value $I_{limit}$, and fails at a time point $t_2$. A life $\tau$ of the light-emitting device 24 in the present embodiment, therefore, is the sum of a period $\tau_1$, which starts at the time point $t_0$ at which use of the light-emitting device 24 starts and ends at the time point $t_1$ at which the average driving current reaches the maximum value $I_{limit}$, and the period $\tau_{life}$, which starts at the time point $t_1$ and ends with the failure of the light-emitting device 24.

If the period $\tau_1$ can be identified, the life $\tau$ of the light-emitting device 24 can be calculated using the period $\tau_{life}$ calculated based on expression (2). Deterioration of a VCSEL, however, is caused by a defect generated in the device due to supplied driving current, and how often a defect occurs varies depending on an average driving current. It is therefore difficult to accurately identify the period $\tau_1$.

Figure 18:
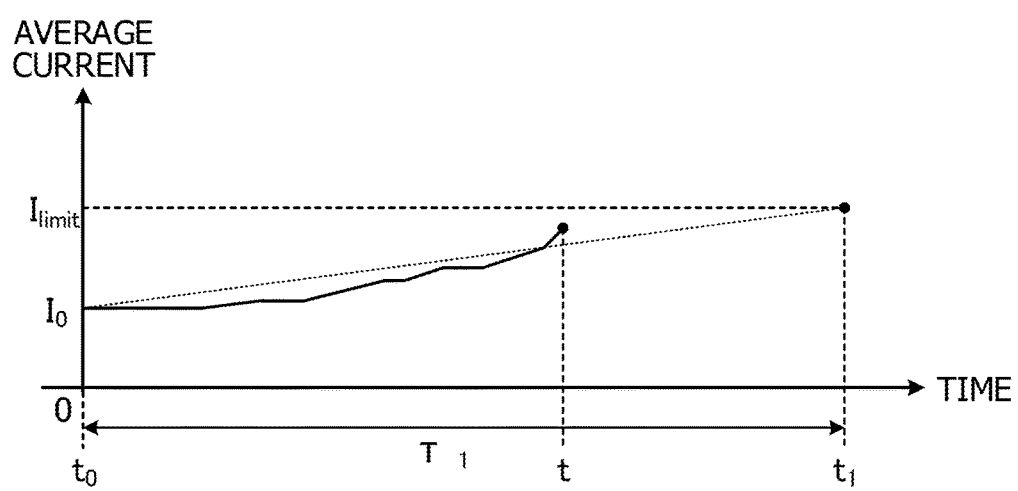
FIG. 18 illustrates an example of a process for calculating the life.

The life calculation unit 622 estimates the trend of change in the average driving current supplied to the light-emitting device 24 based on a history of time points at which control instructions to increase average current have been transmitted. The life calculation unit 622 then identifies, based on the estimated trend, the time point $t_1$ at which the average driving current reaches the maximum value $I_{limit}$. More specifically, as illustrated in FIG. 18, for example, changes in the average driving current from the time point $t_0$, at which use of the light-emitting device 24 has started, to a current time point t are approximated by a straight line or a curve using a method of least squares or the like. A time point at which the straight line or the curve reaches the maximum value $I_{limit}$ of the average driving current is then estimated as the time point $t_1$. As a result, the life calculation unit 622 can accurately estimate the life $\tau$ of the light-emitting device 24.

The life calculation unit 622 displays the life table 634 stored in the database 630 on the display 65 through the output interface 64 in accordance with an instruction from a user of the server 60 or the like. By referring to the life table 634 displayed on the display 65, the manager who manages the states of the optical transceivers 20 of the communication apparatuses 11 can determine when to replace the light-emitting devices 24 of the optical transceivers 20.

Figure 19:
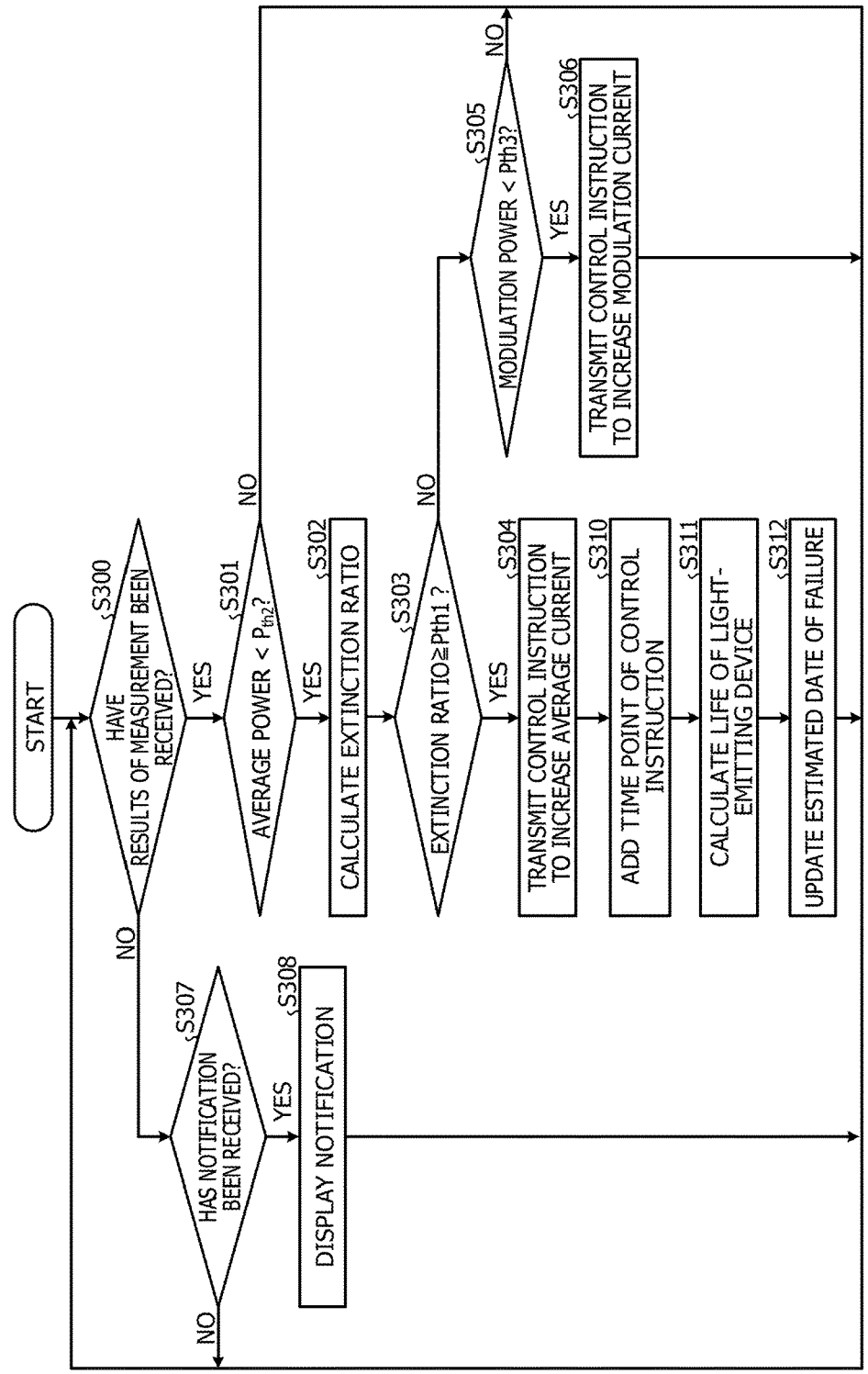
FIG. 19 illustrates an example of an operation performed by the server.

FIG. 19 illustrates an example of an operation performed by the server 60. The server 60 starts the operation illustrated in this flowchart at a certain timing such as after the server 60 is turned on. In FIG. 19, processing steps given the same reference numerals as in FIG. 12 are the same as those described with reference to FIG. 12 unless otherwise noted, and detailed description thereof is omitted.

If the extinction ratio ER is equal to or higher than the threshold $P_{th1}$ (YES in S303), the determination unit 620 outputs, to the communication interface 61, a control instruction to increase average current. The communication interface 61 transmits, through the communication cables 16 and the communication network 17, the control instruction to increase average current to the optical transceiver 20 that has transmitted optical signals (S304). The determination unit 620 refers to the history table 631 stored in the database 630 to identify an individual table 633 associated with identification information 632 regarding the optical transceiver 20 to which the control instruction has been transmitted. The determination unit 620 then newly registers, to the identified individual table 633, a time point at which the control instruction has been transmitted (S310).

The life calculation unit 622 obtains information regarding time points registered in the individual table 633 to which the time point has been newly registered and the identification information 632 associated with the individual table 633. The life calculation unit 622 extracts, from the life table 634, a date of first use and an initial value of average current associated with the obtained identification information 632. The life calculation unit 622 then calculates the life of the light-emitting device 24 of the optical transceiver 20 corresponding to the obtained identification information 632 (S311).

The life calculation unit 622 approximates the trend of change in the average driving current supplied to the light-emitting device 24 by a straight line or a curve based on a history of time points at which control instructions to increase average current have been transmitted. The life calculation unit 622 then estimates the period $\tau_1$, which starts at the time point $t_0$ at which use of the light-emitting device 24 has started and ends at the time point $t_1$ at which the straight line or the curve reaches the maximum value $I_{limit}$ of the average driving current. The life calculation unit 622 calculates, based on expression (2), the period $\tau_{life}$, which indicates the life of the light-emitting device 24 at a time when the light-emitting device 24 is used with the average driving current kept at the maximum value $I_{limit}$. The life calculation unit 622 then calculates the sum of the period $\tau_1$ and the period $\tau_{life}$ as the life $\tau$ of the light-emitting device 24.

The life calculation unit 622 identifies a date based on the date of first use extracted from the life table 634 and the calculated life $\tau$ as an estimated date of failure. The life calculation unit 622 then updates an estimated date of failure in the life table 634 associated with the obtained identification information 632 using the identified estimated date of failure (S312). The determination unit 620 performs the processing in operation S300 again.

In the optical communication system 10, the server 60 illustrated in FIG. 14 includes the life calculation unit 622 and the output interface 64. The life calculation unit 622 calculates the life of the light-emitting device 24 based on the amount of change in the driving current supplied to the light-emitting device 24 of the optical transceiver 20 that has transmitted optical signals. The output interface 64 outputs information indicating the life of the light-emitting device 24 calculated by the life calculation unit 622 to the display 65. As a result, the manager who manages the states of the optical transceivers 20 of the communication apparatuses 11 can replace the light-emitting devices 24 before the light-emitting devices 24 fail, which improves the reliability of the optical communication system 10.

In FIG. 14, the light-receiving device 28 of the optical transceiver 20 that has received optical signals measures the average power $P_{ave}$ and the like of the optical signals output from the light-emitting device 24 of the optical transceiver 20 that has transmitted the optical signals. The average power $P_{ave}$ measured by the light-receiving device 28 can decrease due to deterioration of the light-emitting device 24 that has transmitted the optical signals or misalignment or deterioration of an optical system provided between the light-emitting device 24 and the light-receiving device 28 of the optical transceiver 20 that has received the optical signals.

For example, the average power $P_{ave}'$ of optical signals output from the light-emitting device 24 of the optical transceiver 20 that has transmitted optical signals is measured between the light-emitting device 24 and the optical component 25. A difference between the average power $P_{ave}'$ measured by the optical transceiver 20 that has transmitted the optical signals and the average power $P_{ave}$ measured by the optical transceiver 20 that has received the optical signals is output to the display 65 or the like along with the information indicating the estimated life of the light-emitting device 24. As a result, the manager who manages the states of the optical transceivers 20 of the communication apparatuses 11 can determine whether the life of the light-emitting device 24 of the optical transceiver 20 has ended without an external cause or due to misalignment or deterioration of the optical system. The light-emitting device 24, therefore, is not prematurely replaced. The configuration of the optical communication system 10 is the same as that of the optical communication system 10 described with reference to FIG. 8, and detailed description thereof is omitted.

Figure 20:
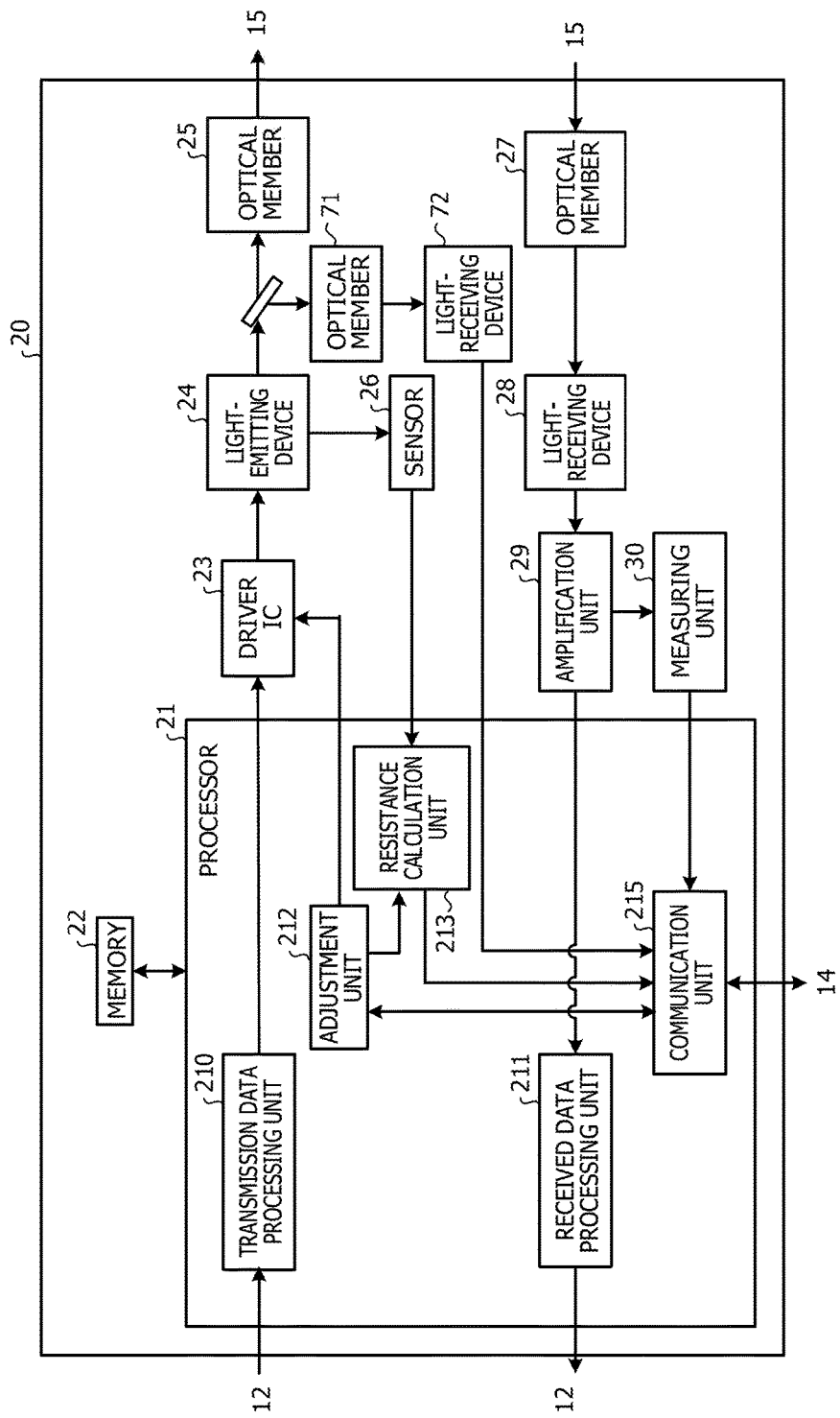
FIG. 20 illustrates an example of the optical transceiver.

FIG. 20 illustrates an example of an optical transceiver. An optical transceiver 20 includes the processor 21, the memory 22, the driver IC 23, the light-emitting device 24, the optical component 25, the sensor 26, the optical component 27, the light-receiving device 28, the amplification unit 29, the measuring unit 30, a tap 70, an optical component 71, and a light-receiving device 72. The processor 21 executes programs read from the memory 22 to achieve functions of the transmission data processing unit 210, the received data processing unit 211, the adjustment unit 212, the resistance calculation unit 213, and the communication unit 215. In FIG. 20, blocks given the same reference numerals as in FIG. 9 are the same as those the blocks described with reference to FIG. 9 unless otherwise noted, and detailed description thereof is omitted.

The tap 70 is arranged between the light-emitting device 24 and the optical component 25. The tap 70 causes optical signals output from the light-emitting device 24 to pass therethrough to the optical component 25 and refracts part of the optical signals output from the light-emitting device 24 to the optical component 71. The tap 70 is an example of a refraction unit. The optical component 71 includes a lens, a mirror, and the like. The optical component 71 guides the optical signals refracted by the tap 70 to a light-receiving surface of the light-receiving device 72.

The light-receiving device 72 converts the optical signals guided by the optical component 71 to the light-receiving surface thereof into electrical signals and outputs the electrical signals to the processor 21. The light-receiving device 72 is an example of a second measuring unit. The light-receiving device 72 has a response speed of about several MHz. Because a frequency band of optical signals transmitted from the light-emitting device 24 is tens of GHz, the electrical signals obtained by the light-receiving device 72 have the average power $P_{ave}'$ of the optical signals transmitted from the light-emitting device 24. Because the response speed of the light-receiving device 72 is significantly lower than the response speed of the light-receiving device 28, the light-receiving device 72 having a light-receiving surface larger than that of the light-receiving device 28 can be used. The optical component 71 for guiding light to the light-receiving surface of the light-receiving device 72, therefore, can be made smaller than the optical component 27 for guiding light to the light-receiving device 28. Even when the tap 70, the optical component 71, and the light-receiving device 72 are provided for the optical transceiver 20, therefore, the optical transceiver 20 does not become large.

The electrical signals that have been output from the light-receiving device 72 and that exhibit the average power $P_{ave}'$ are converted from analog signals into digital signals and input to the communication unit 215. The communication unit 215 adds a header or the like to the average power $P_{ave}'$ output from the light-receiving device 72 to obtain a measurement signal in a certain format and outputs the measurement signal to the communication interface 14. The communication interface 14 transmits the measurement signal output from the communication unit 215 to the server 60 through the communication cables 16 and the communication network 17.

The configuration of the server 60 is the same as that of the server 60 according to the third embodiment described with reference to FIG. 14 and will be described with reference to FIG. 14. Blocks illustrated in FIG. 14 are the same in the present embodiment unless otherwise noted, and detailed description thereof is omitted.

The database 630 stores, for example, a life table 634 illustrated in FIG. 21. FIG. 21 is a diagram illustrating an example of the life table 634 according to a fourth embodiment. The life table 634 according to the present embodiment stores information regarding a date of first use, an initial value of average current, an estimated date of failure, and a power difference associated with identification information regarding each optical transceiver 20.

The determination unit 620 receives, through the communication interface 61, results of measurement from the optical transceiver 20 that has received optical signals. The determination unit 620 also receives, through the communication interface 61, the average power $P_{ave}'$ from the optical transceiver 20 that has transmitted the optical signals. The determination unit 620 then calculates a difference between the average power $P_{ave}'$ and the average power $P_{ave}$ included in the results of measurement. The determination unit 620 registers information regarding the calculated power difference to the life table 634 while associating the information with identification information regarding the optical transceiver 20 that has transmitted the optical signals. If information regarding a power difference is already registered in the life table 634, the determination unit 620 updates the information regarding the power difference registered in the life table 634 using the information regarding the calculated power difference.

The life calculation unit 622 displays the life table 634 stored in the database 630 on the display 65 through the output interface 64, for example, in accordance with an instruction from the user of the server 60.

In the optical communication system 10, the optical transceiver 20 illustrated in FIG. 20 includes the tap 70, the light-receiving device 72, and the communication unit 215. The tap 70 refracts part of optical signals output from the light-emitting device 24 to the optical fiber 15. The light-receiving device 72 measures the average power $P_{ave}'$ of the optical signals refracted by the tap 70. The communication unit 215 transmits the average power $P_{ave}'$ measured by the light-receiving device 72 to the server 60. The output interface 64 of the server 60 outputs, to the display 65, a difference between the average power $P_{ave}$ measured by the measuring unit 30 of the optical transceiver 20 that has received optical signals and the average power $P_{ave}'$ measured by the light-receiving device 72 of the optical transceiver 20 that has transmitted the optical signals. As a result, the manager who manages the states of the optical transceivers 20 of the communication apparatuses 11 can determine whether the life of the light-emitting device 24 of each optical transceiver 20 has ended without an external cause or due to misalignment or deterioration of the optical system. The light-emitting device 24, therefore, is not prematurely replaced.

The techniques disclosed herein are not limited to the above embodiments and may be modified in various ways within a scope thereof.

Although the optical transceivers 20 communicate control instructions with each other through the communication interface 14 and the communication cables 16 in FIG. 1, for example, the techniques disclosed herein are not limited to this. If the optical transceivers 20 are connected to each other by a cable including a plurality of optical fibers 15, for example, the optical transceivers 20 may communicate control instructions using, in the cable, optical fibers 15 that are not used for data communication. If the optical transceivers 20 are connected to each other by a cable including twelve optical fibers 15, and if four optical fibers 15 are used for transmission of optical signals and four optical fibers 15 are used for reception of optical signals, the remaining four optical fibers 15 are not used for data communication. The optical transceivers 20, therefore, communicate control instructions using, in the cable, the optical fibers 15 that are not used for data communication.

A communication band for communicating control instructions may be about several Mbps. In this case, in the communication of control instructions, the light-emitting device 24, the optical component 25 that guides optical signals from the light-emitting device 24 to the optical fiber 15, the light-receiving device 28, the optical component 27 that guides optical signals received through the optical fiber 15 to the light-receiving surface of the light-receiving device 28, and the like can be reduced in size.

Although the server 60 determines, based on results of measurement transmitted from the optical transceiver 20 that has received optical signals, whether the average power $P_{ave}$ is smaller than the threshold $P_{th2}$ in the above description, the techniques disclosed herein are not limited to this. In FIG. 14, for example, the optical transceiver 20 that has received optical signals may determine whether the average power $P_{ave}$ is smaller than the threshold $P_{th2}$, and a control instruction may be transmitted to the optical transceiver 20 that has transmitted the optical signals through the server 60, instead. In this case, communication traffic between the optical transceiver 20 that has received the optical signals and the server 60 can be suppressed.

In FIGS. 8 to 21, the server 60 may record, for each optical transceiver 20, the number of control instructions to increase average current transmitted and the number of control instructions to increase modulation current transmitted and display these pieces of information on the display 65 or the like. By referring to these pieces of information regarding control instructions displayed on the display 65, the manager who manages the states of the optical transceivers 20 of the communication apparatuses 11 can how severely the light-emitting devices 24 of the optical transceivers 20 have deteriorated in each deterioration mode.

The processing blocks included in the optical transceivers 20 and the server 60 are defined in consideration of the functions in accordance with types of processing to be performed in order to facilitate understanding of the optical transceivers 20 and the server 60. The techniques disclosed herein, therefore, are not limited by how the processing blocks are defined or names of the processing blocks. The processing blocks included in the optical transceivers 20 and the server 60 can be further divided into a larger number of processing blocks in accordance with types of processing to be performed, or a plurality of processing blocks can be integrated with each other as a single processing block. Processing performed by each processing block may be achieved as processing by software or by dedicated hardware such as an application-specific integrated circuit (ASIC).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical communication apparatus comprising:
a light-receiving device that receives a first optical signal transmitted from another optical communication apparatus through an optical fiber and converts the first optical signal into an electrical signal;
a first measurement circuit that measures a first average power and a first modulation power of the first optical signal based on the electrical signal;
a light-emitting device that transmits a second optical signal to the another optical communication apparatus by emitting light in accordance with a driving current;
a driver that causes the light-emitting device to transmit the second optical signal according to a transmission signal by controlling the driving current based on the transmission signal; and
a processor that
generates a first control instruction to adjust the first optical signal based on the first average power and the first modulation power;
transmits the first control instruction to the another optical communication apparatus;
receives a second control instruction based on a second average power and a second modulation power of the second optical signal from the another optical communication apparatus; and
adjusts the driving current based on the second control instruction.

2. The optical communication apparatus according to claim 1, wherein the processor:
determines whether an extinction ratio of the first optical signal is equal to or more than a first threshold value; and
transmits, to the another optical communication apparatus, the first control instruction to increase the first average current when determining that the extinction ratio is equal to or more than the first threshold value.

3. The optical communication apparatus according to claim 2, wherein the processor: adjusts the driving current so as to increase an average value of the driving current when receiving the second control instruction to increase the second average current.

4. The optical communication apparatus according to claim 2, wherein the processor: calculates the extinction ratio when the first average power is less than a second threshold value.

5. The optical communication apparatus according to claim 2, wherein the processor:
determines whether the first modulation power is less than a third threshold value when the extinction ratio is less than the first threshold value; and
transmits, to the another optical communication apparatus, the first control instruction to increase a modulation current when determining that the first modulation power is less than the third threshold value.

6. The optical communication apparatus according to claim 5, wherein the processor: adjusts an amplitude of the driving current so as to increase an amplitude of the second optical signal transmitted by the light-emitting device when receiving the second control instruction to increase the modulation current.

7. The optical communication apparatus according to claim 1, wherein the processor: controls the driving current in such a manner that an average of the driving current becomes a maximum value when an average of the driving current adjusted based on the second average power which is measured by another measurement circuit of the another optical communication apparatus reaches an allowable maximum value of the average of the driving current for the light-emitting device.

8. The optical communication apparatus according to claim 7, wherein the processor controls the driving current in such a manner that the average of the driving current becomes the maximum value when receiving a control instruction from the another optical communication apparatus after the second average power which is measured by the another measurement circuit of the another optical communication apparatus reaches the allowable maximum value.

9. An optical communication system comprising:
a first optical communication device that transmits a first optical signal through an optical fiber;
a second optical communication device that receives the first optical signal transmitted from the first optical transmission device through the optical fiber; and
a management device that communicates with the first optical communication device and the second optical communication device,
the second optical reception device includes:
a light-receiving device that receives the first optical signal and converts the first optical signal into an electrical signal;
a first measurement circuit that measures a first average power and a modulation power of the first optical signal based on the electrical signal;
a light-emitting device that transmits a second optical signal to the first optical communication apparatus by emitting light in accordance with a driving current;
a driver that causes the light-emitting device to transmit the second optical signal according to a transmission signal by controlling the driving current based on the transmission signal; and
a processor that
generates a first control instruction to adjust the first optical signal based on the first average power and the first modulation power;
transmits the first control instruction to the another optical communication apparatus;
receives a second control instruction based on a second average power and a second modulation power of the second optical signal from the another optical communication apparatus; and
adjusts the driving current based on the second control instruction,
the management device:
receives information regarding the light-emitting device from the second optical communication device.

10. The optical communication system according to claim 9 wherein the second optical communication device: adjusts the driving current so as to increase an average value of the driving current when receiving the control instruction to increase the average current.

11. The optical communication system according to claim 9 wherein the management device:
calculates a remaining lifespan of the light-emitting device based on an amount of change in the drive current; and
outputs information indicating the remaining lifespan to an output device.

12. The optical communication system according to claim 9 wherein the second optical communication device includes:
a branch circuit that branches the light signal from the light-emitting device to the optical fiber; and
a second measurement circuit that measures an average power of the branched optical signal, wherein the processor outputs the average power measured by the second measurement circuit to the management device.

13. The optical communication system according to claim 12 wherein the management device: calculates a difference between the average power measured by the first measurement circuit and the average power measured by the second measurement circuit; and outputs the difference to an output device.

14. The optical communication system according to claim 9 wherein information regarding the light-emitting device indicates that an average current of the light-emitting device reaches a maximum value.

* * * * *